US012279061B2

(12) United States Patent
Malakar et al.

(10) Patent No.: US 12,279,061 B2
(45) Date of Patent: Apr. 15, 2025

(54) MIPI C-PHY AND D-PHY INTERFACE WITH SHARED DRIVER, EQUALIZATION, AND DATA PATH CIRCUITRY

(71) Applicant: SEMICONDUCTOR COMPONENTS INDUSTRIES, LLC, Scottsdale, AZ (US)

(72) Inventors: Jhankar Malakar, Corvallis, OR (US); Arindam Raychaudhuri, Bangalore (IN)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 184 days.

(21) Appl. No.: 18/182,644

(22) Filed: Mar. 13, 2023

(65) Prior Publication Data
US 2024/0314466 A1 Sep. 19, 2024

(51) Int. Cl.
| | |
|---|---|
| *H04N 25/766* | (2023.01) |
| *H04L 7/00* | (2006.01) |
| *H04N 25/76* | (2023.01) |
| *H04N 25/767* | (2023.01) |

(52) U.S. Cl.
CPC ......... *H04N 25/766* (2023.01); *H04N 25/767* (2023.01); *H04N 25/7795* (2023.01); *H04L 7/0087* (2013.01)

(58) Field of Classification Search
CPC ............... H04N 25/766; H04N 25/767; H04N 25/7795; H04L 7/0087; H04L 25/0278; H04L 25/03006; G06F 13/4072; G06F 13/4068; G06F 21/76
See application file for complete search history.

(56) References Cited

U.S. PATENT DOCUMENTS

| | | | |
|---|---|---|---|
| 9,148,198 B1 | 9/2015 | Zhang et al. | |
| 9,959,805 B2 | 5/2018 | Itoigawa et al. | |
| 10,263,762 B2* | 4/2019 | Chang | G09G 3/20 |
| 10,419,246 B2 | 9/2019 | Duan et al. | |
| 2015/0049230 A1* | 2/2015 | Lee | H04N 25/767 348/308 |
| 2015/0146766 A1 | 5/2015 | Longo et al. | |
| 2019/0386855 A1* | 12/2019 | Hayashi | H03K 19/018557 |

(Continued)

*Primary Examiner* — Twyler L Haskins
*Assistant Examiner* — John H Morehead, III
(74) *Attorney, Agent, or Firm* — Treyz Law Group, P.C.; Jason Tsai

(57) ABSTRACT

Imaging circuitry may include half-driver sub-circuits configured to support Mobile Industry Processor Interface (MIPI) D-PHY mode and C-PHY mode. Groups of two half-driver sub-circuits can be coupled together in the D-PHY mode, whereas groups of three half-driver sub-circuits can be coupled together in the C-PHY mode. Each half-driver sub-circuit can include one or more pull-up paths and one or more pull-down paths. Each half-driver sub-circuit can include multiple slices, a first portion of which can be operated to pull in a first direction and a second portion of which can be operated to pull in a second direction opposing the first direction to achieve the desired amount of equalization. The half-driver sub-circuits can be employed as the final driver stage of a shared data path architecture supporting both D-PHY and C-PHY modes. The shared data path can include serializers, pre-driver logic, and/or equalization enable blocks.

20 Claims, 19 Drawing Sheets

(56) References Cited

U.S. PATENT DOCUMENTS

| | | |
|---|---|---|
| 2020/0244257 A1 | 7/2020 | Ji et al. |
| 2022/0377268 A1* | 11/2022 | Kim ..................... H04N 25/705 |
| 2023/0011466 A1 | 1/2023 | Raychaudhuri et al. |
| 2023/0090431 A1* | 3/2023 | Banin ..................... H04B 1/04 |
| | | 375/295 |

\* cited by examiner

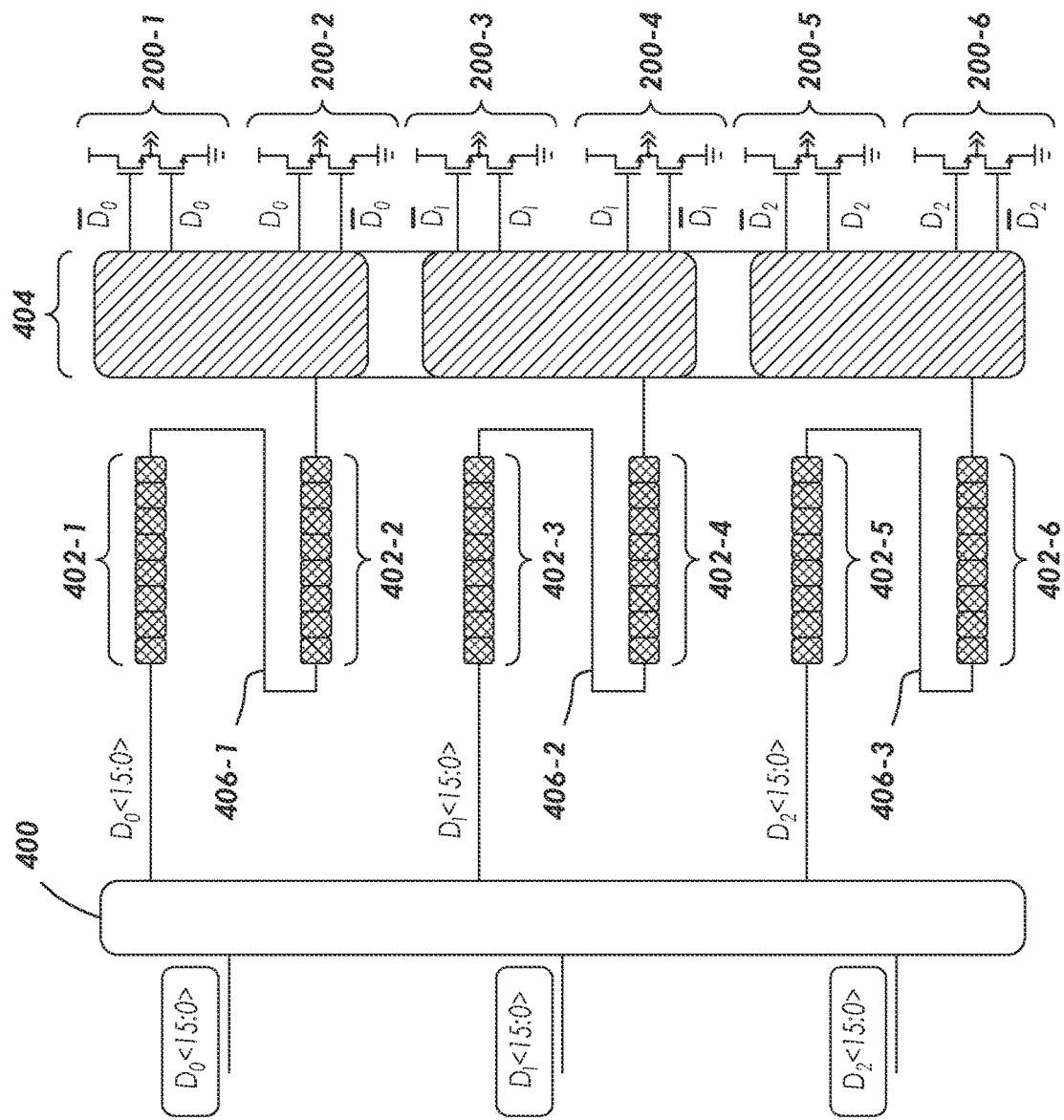

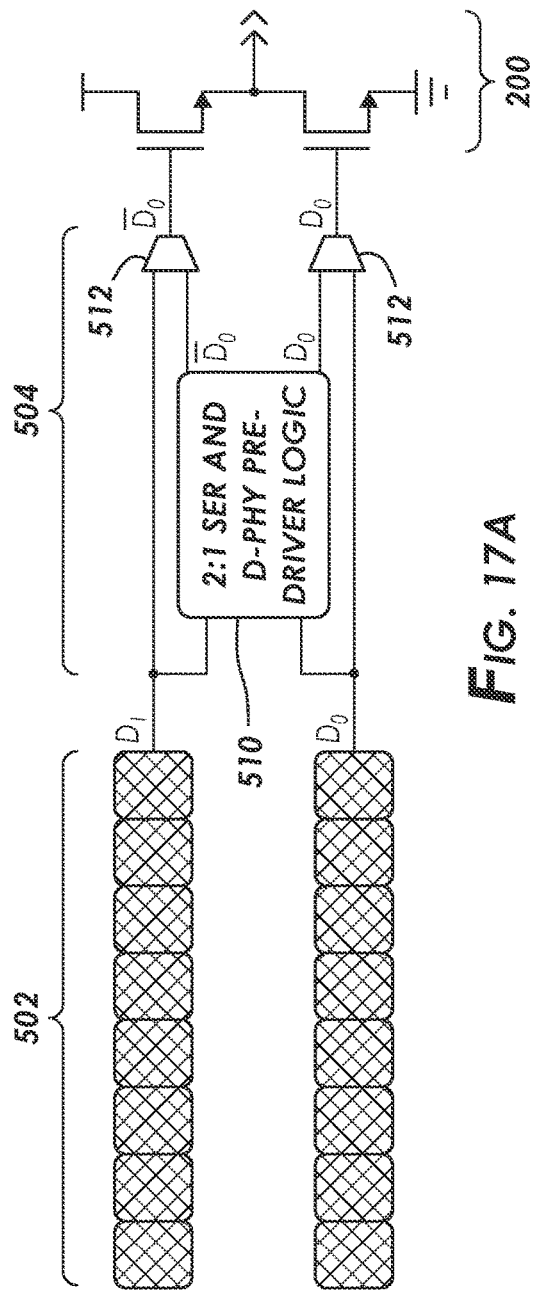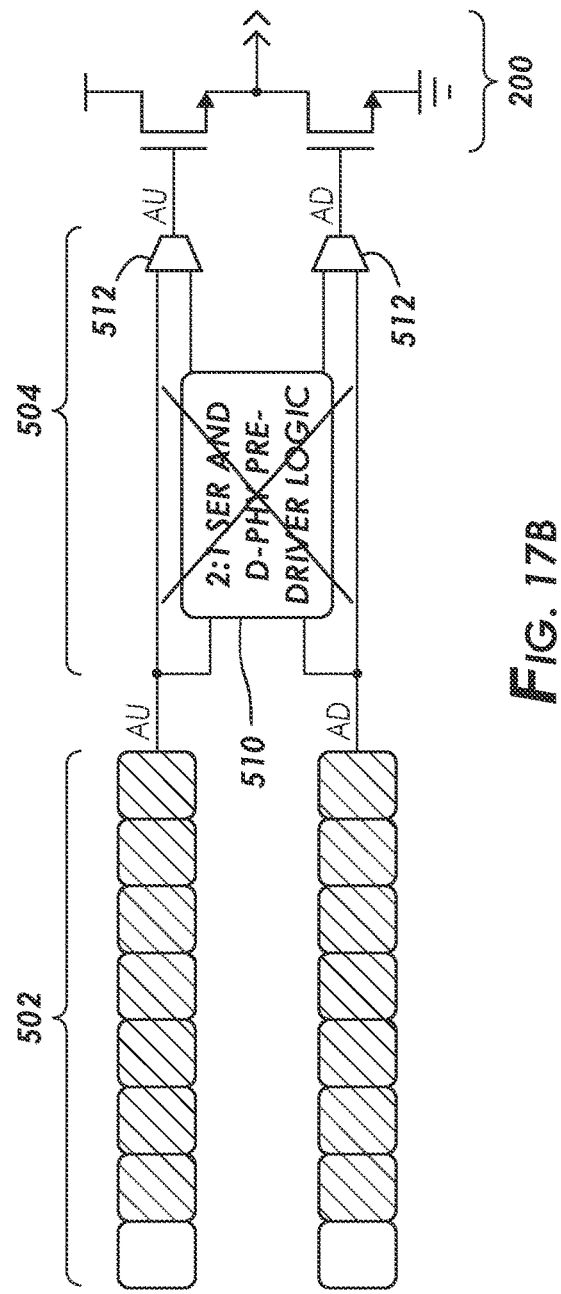

MIPI C-PHY AND D-PHY INTERFACE WITH SHARED DRIVER, EQUALIZATION, AND DATA PATH CIRCUITRY

FIELD

This relates generally to electronic systems, and more particularly, to physical interfaces in electronic systems.

BACKGROUND

An electronic system can include multiple components that are communicatively coupled to each other via corresponding physical interfaces. In some applications, two or more components can communicate with each other in accordance with Mobile Industry Processor Interface (MIPI) protocols. MIPI specifications include physical interface layer protocols such as D-PHY and C-PHY. Some systems employ only D-PHY transceiver components. Other systems employ only C-PHY transceiver components. Conventional systems do not have shared interface circuitry that can support both D-PHY and C-PHY protocols.

It is within this context that the embodiments herein arise.

BRIEF DESCRIPTION OF THE DRAWINGS

FIG. 15A is a diagram of a shared data path with multiple 8-bit serializers configured in D-PHY mode in accordance with some embodiments.

FIG. 17A is a diagram showing D-PHY pre-driver logic in D-PHY mode in accordance with some embodiments.

FIG. 17B is a diagram showing D-PHY pre-driver logic being bypassed in C-PHY mode in accordance with some embodiments.

DETAILED DESCRIPTION

Embodiments of the present technology relate to electronic devices with image sensors. It will be recognized by one skilled in the art that the present exemplary embodiments may be practiced without some or all of these specific details. In other instances, well-known operations have not been described in detail in order not to unnecessarily obscure the present embodiments.

Electronic devices such as digital cameras, computers, cellular telephones, and other electronic devices may include image sensors that gather incoming light to capture an image. The image sensors may include arrays of pixels, sometimes referred to as image sensor pixels or imaging pixels. The image sensor pixels include photosensitive elements such as photodiodes that convert the incoming light into image signals. Image sensors may include hundreds, thousands, or millions of imaging pixels. Image sensors may include control circuitry such as driver circuitry for selectively accessing the pixels and readout circuitry for reading out image signals corresponding to the electric charge generated by the photosensitive elements.

Figure 1:
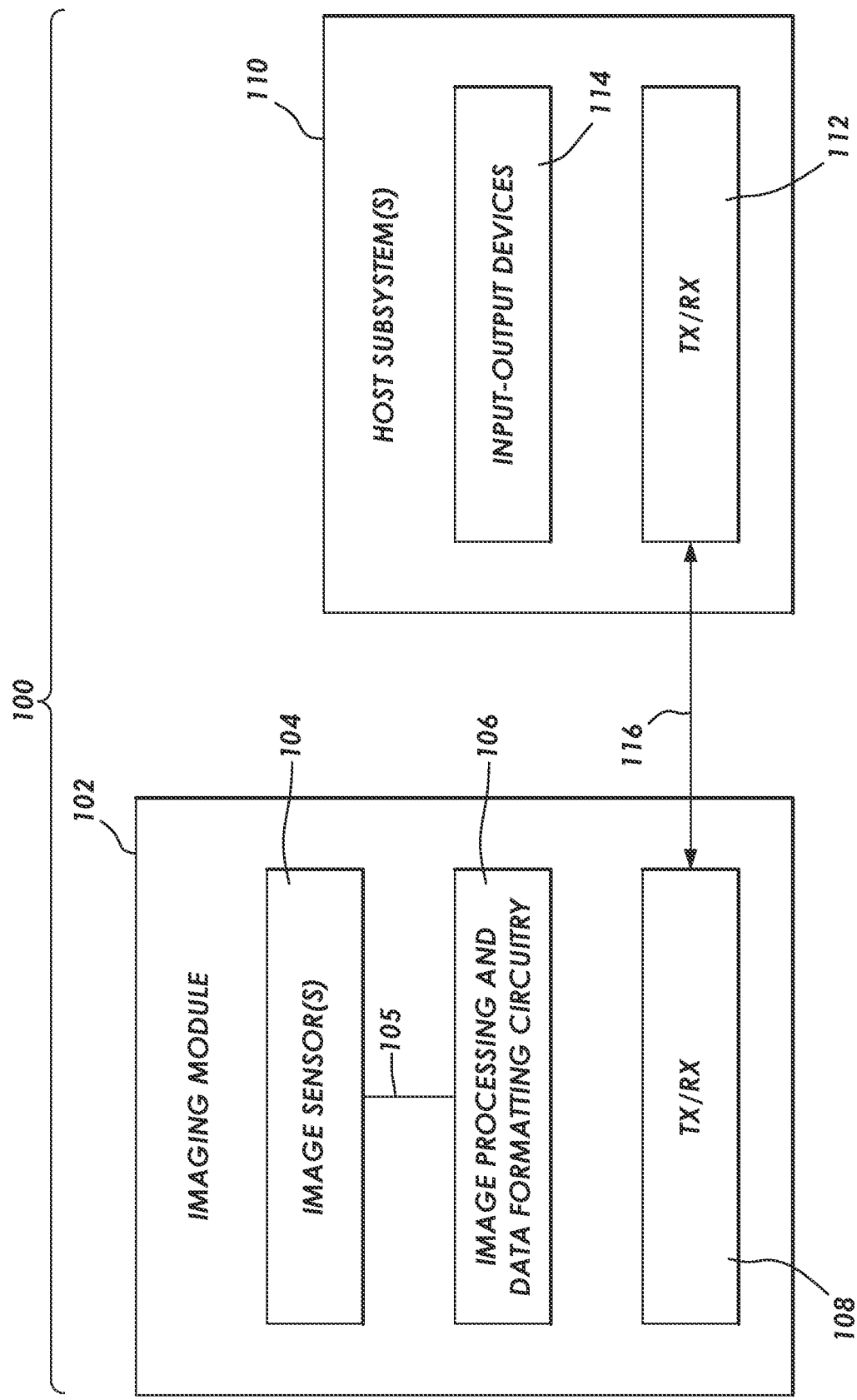
FIG. 1 is a diagram of an illustrative system having an image sensor in accordance with some embodiments.

FIG. 1 is a diagram of an illustrative system 100 that uses an image sensor to capture images. System 100 of FIG. 1 may be an electronic device such as a camera, a cellular telephone, a video camera, or other electronic device that captures digital image data, may be a vehicle safety system (e.g., an active braking system or other vehicle safety system), or may be a surveillance system. In the example of FIG. 1, system 100 can include an imaging sub-system such as imaging module 102, sometimes referred to herein as imaging system, imaging circuitry, or camera module.

Imaging module 102 may be used to convert incoming light into digital image data. Imaging module 102 may include one or more corresponding image sensors 104 and one or more lenses over image sensors 104. Image sensor 104 is sometimes referred to as an optical sensor. Image sensor 104 may be formed on one or more integrated circuit (IC) chips. During image capture operations, each lens may focus light onto an associated image sensor 104. Image sensor 104 may include photosensitive elements such as image sensor pixels that convert incoming light into digital data. Image sensor 104 may include hundreds of pixels, thousands of pixels, millions of pixels, or any desired number of image sensor or imaging pixels. The lenses may include fixed and/or adjustable lenses and may include microlenses formed on an imaging surface of image sensor 104 and other macro lenses. If desired, imaging (camera) module 102 may be provided with an array of lenses and an array of corresponding image sensors 104.

Each image sensor in camera module 102 may be identical or there may be different types of image sensors within camera module 102. In some examples, image sensor 104 may further include bias circuitry, sample and hold circuitry, correlated double sampling (CDS) circuitry, amplifier circuitry, analog-to-digital converter (ADC) circuitry, data readout circuitry, memory/buffer circuitry, and/or addressing circuitry. During image capture operations, light from a scene may be focused onto image sensor 104 by the lenses. The data readout and converter circuitry in image sensor 104 can be used to convert analog pixel image signals into corresponding digital image data, which can then be provided to image processing and data formatting circuitry 106 via path 105. If desired, circuitry 106 may also be used to control the operation of image sensor 104, such as by providing timing, control signals, supply and/or bias voltages, etc. to image sensor 104.

Still and video image data from image sensor 104 can be provided to image processing and data formatting circuitry 106 over path 105. The image processing and data formatting circuitry 106 may be used to perform image processing functions such as data formatting, adjusting white balance and exposure, implementing video image stabilization, or face detection, just to name a few examples. Image processing and data formatting circuitry 106 can sometimes be considered to be part of an image signal processor. Such image processing and data formatting circuitry 106 may additionally or alternatively be used to compress raw camera image files if desired (e.g., to Joint Photographic Experts Group or JPEG format).

In one example arrangement, such as a system on chip (SoC) arrangement, image sensor 104 and image processing and data formatting circuitry 106 are implemented on a common semiconductor substrate (e.g., as part of a common silicon image sensor integrated circuit die). In other arrangements, image sensor 104 and circuitry 106 may be formed on separate semiconductor substrates (e.g., as part of different integrated circuit dies). For example, image sensor 104 and the image processing and data formatting circuitry 106 may be formed on separate IC dies that are stacked vertically with respect to each other.

Imaging module 102 may convey acquired image data to a separate host subsystem 110 via path 116. Host subsystem 20 may include input-output devices 114 and other storage and processing circuitry. For example, storage circuitry within host subsystem 110 may also volatile and/or non-volatile memory (e.g., random-access memory, flash memory, hard drives, solid-state drives, etc.), whereas processing circuitry within host subsystem 110 may include microprocessors, microcontrollers, digital signal processors, and/or application specific integrated circuits. Host subsystem 20 may include processing software for detecting objects in images, detecting motion of objects between image frames, determining distances to objects in images, or filtering or otherwise processing images provided by imaging system 10. If desired, system 100 may provide a user with numerous high-level functions. In a computer or cellular telephone, for example, a user may be provided with the ability to run user applications. For these functions, input-output devices 114 of host subsystem 110 may include keypads, input-output ports, buttons, and displays.

Imaging module 102 may also include a transmitter component such as transmitter 108 for driving signals onto communications path 116. If desired, transmitter 108 may form a part of integrated transceiver circuitry. Transmitter 108 may be configured to convey the digital image data (or if desired, raw analog image signals) to a corresponding receiver component such as receiver 112 within host subsystem 110 via communications path (link) 116. Communications path 116 may provide any suitable number of communications channels or lanes between transmitter circuitry 108 and receiver circuitry 112.

Host subsystem 110 may include receiver 112 coupled to communications path 116. Receiver 112 may also be formed as part of a transceiver (TX/RX) within host subsystem 110, which can include a separate transmitter component for optionally sending signals back to imaging module 102 via communications path 116. Similarly, transmitter 108 may also be formed as part of a transceiver (TX/RX) within imaging module 102, which can include a separate receiver component for optionally receiving signals from host subsystem 110. In some illustrative configurations, one or more of image sensor 104, image processing and data formatting circuitry 106, and transceiver circuitry 108 may be formed as part of an integrated circuit die or may be integrated into the same IC package.

In certain applications, communications path 116 linking imaging module 102 and host subsystem 110 and/or readout path 105 linking image sensor 104 and image processing and data formatting circuitry 106 can be implemented using the Mobile Industry Processor Interface (MIPI). MIPI defines various high-speed serial interface protocols for connecting different components within a mobile or handheld device such as smartphones, tablets, laptops, or other wearable devices. There are several different types of MIPI interfaces, including (among others) the MIPI D-PHY interface and the MIPI C-PHY interface. MIPI D-PHY (referred to herein as simply "D-PHY") uses differential drivers for transferring serial data and is sometimes optimized for longer distance connections. MIPI C-PHY (referred to herein as simply "C-PHY") employs a set of three drivers, referred to and defined herein as a "trio" of drivers, for transferring serial data and is sometimes optimized for shorter-distance connections. Unlike D-PHY that does not use any data encoding, C-PHY uses data encoding and can therefore achieving higher data rates compared to D-PHY.

Figure 2A:
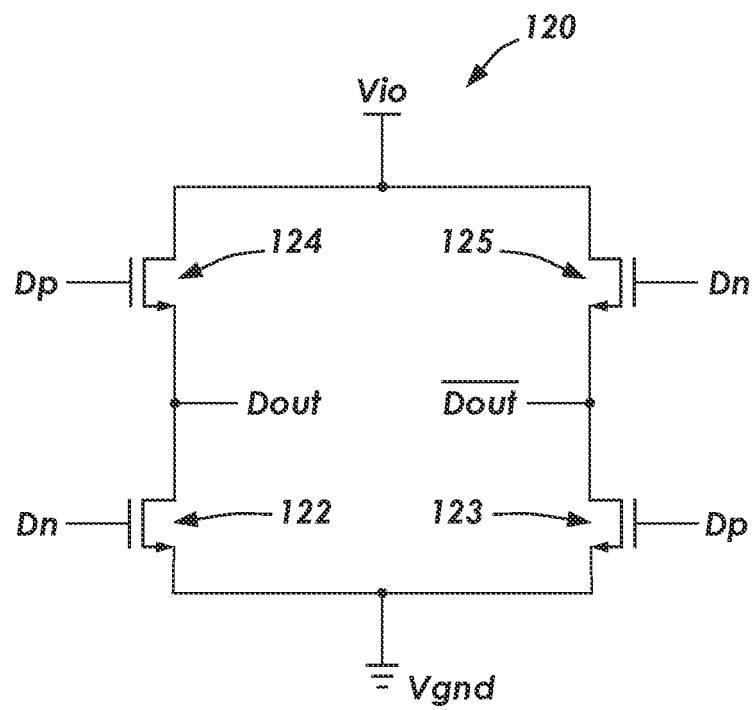
FIGS. 2A and 2B are circuit diagrams of illustrative D-PHY data and clock driver circuits in accordance with some embodiments.
Figure 2B:
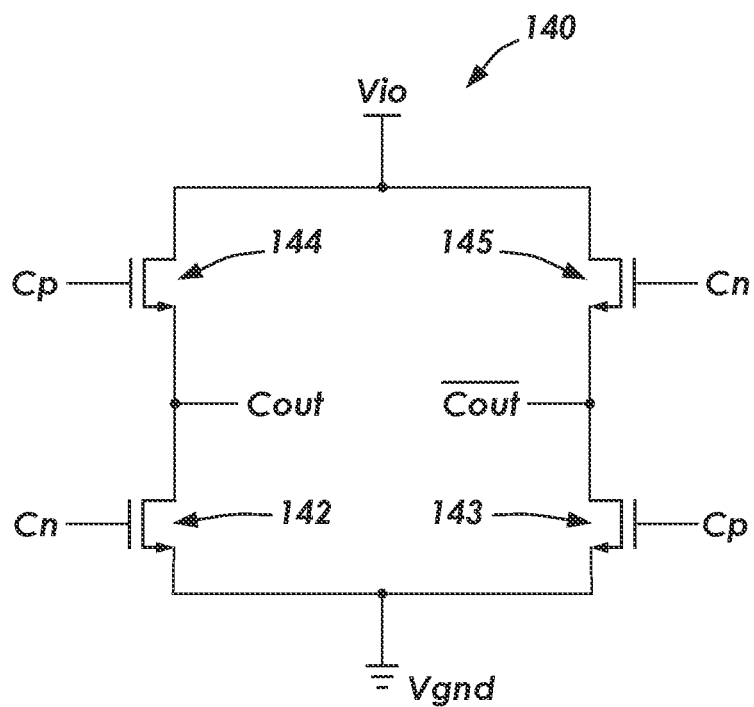

FIGS. 2A and 2B are circuit diagrams of illustrative D-PHY data and clock driver circuits in accordance with some embodiments. In general, D-PHY is a source synchronous physical interface that uses one clock lane and a varying number of data lanes. FIG. 2A shows a data driver circuit 120 in an exemplary data lane and a clock driver circuit 140. D-PHY data driver 120 can include pull-down transistors 122-123 and pull-up transistors 124-125. Transistors 122 and 124 can be coupled in series between a power supply line (e.g., a power supply terminal on which power supply voltage Vio is provided) and a ground line (e.g., a ground power supply line on which ground voltage Vgnd is provided). Transistors 123 and 125 can be coupled in series between the power supply line and the ground line. Transistors 122 and 125 can have gate terminals configured to receive data input signal Dn, whereas transistors 123 and 124 can have gate terminals configured to receive data input signal Dp. A first data output signal Dout can be generated at the node between transistors 122 and 124, whereas a second data output signal/Dout can be generated at the node between transistors 123 and 125. Second data output signal/Dout is the inverted or complementary version of first data output signal Dout. Signal Dout together with/Dout make up the differential output of the DPHY driver 120, which is immune to common mode noise. Transistors 122-125 can all be n-channel metal-oxide-semiconductor (NMOS) transistors (as an example). If desired, transistors 124-125 can optionally be replaced by a p-channel metal-oxide-semiconductor (PMOS) transistor.

Similar to the data lane driver 120, the clock driver circuit 140 of FIG. 2B can include pull-down transistors 142-143 and pull-up transistors 144-145. As shown in FIG. 2B, transistors 142 and 144 can be coupled in series between the power supply line and the ground line. Transistors 143 and 145 can be coupled in series between the power supply line and the ground line. Transistors 142 and 145 can have gate terminals configured to receive clock input signal Cn, whereas transistors 143 and 144 can have gate terminals configured to receive clock input signal Cp. A first clock output signal Cout can be generated at the node between transistors 142 and 144, whereas a second clock output signal/Cout can be generated at the node between transistors 143 and 145. Second clock output signal/Cout is the inverted or complementary version of first clock output signal Cout. Signal Cout together with/Cout make up the differential output of the DPHY clock driver 140. Transistors 142-145 can all be n-channel metal-oxide-semiconductor (NMOS) transistors (as an example). If desired, transistors 144-145 can optionally be replaced by a p-channel metal-oxide-semiconductor (PMOS) transistor.

Figure 3:
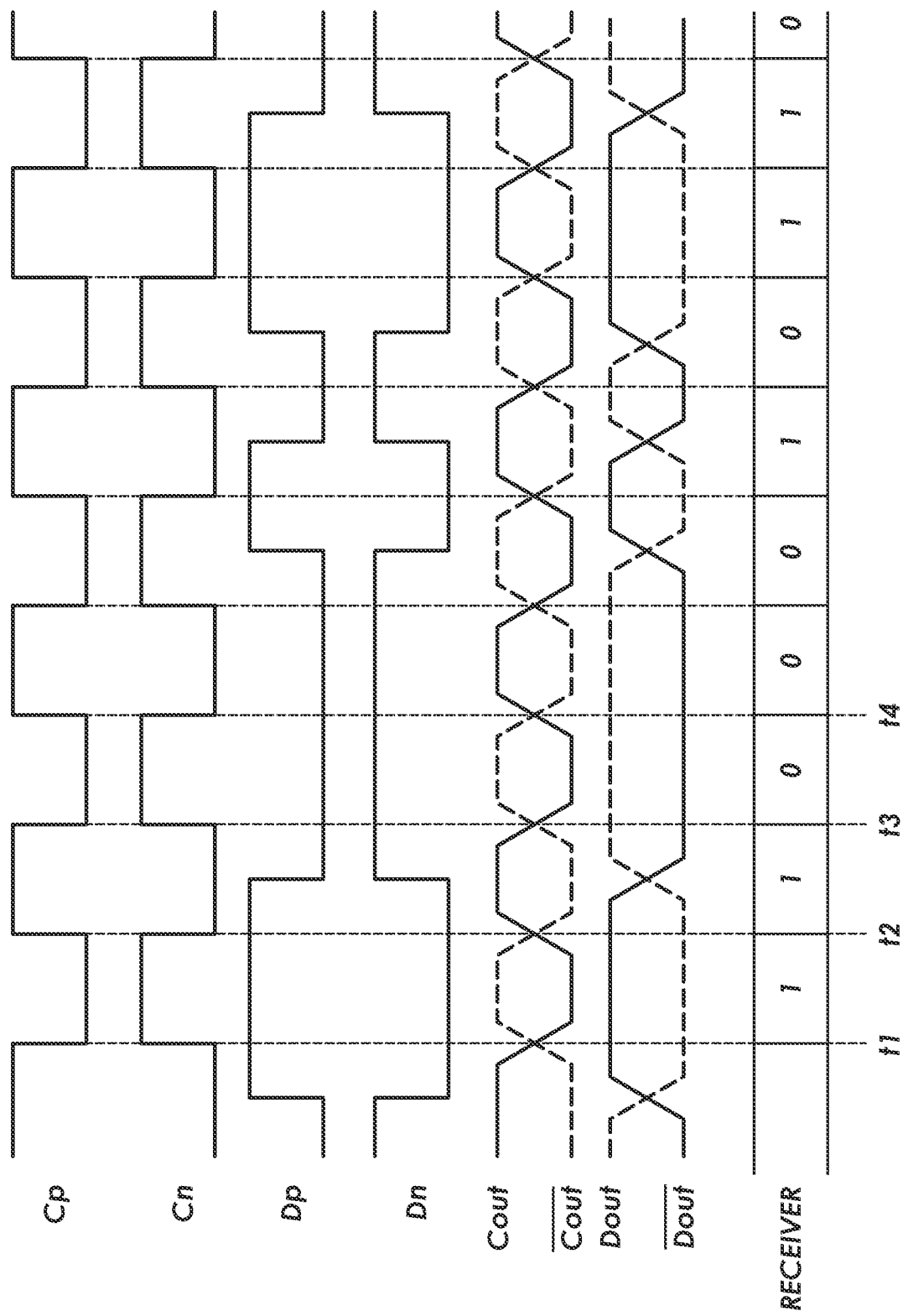
FIG. 3 is a timing diagram illustrating the operation of a D-PHY interface in accordance with some embodiments.

FIG. 3 is a timing diagram illustrating the operation of a D-PHY interface in accordance with some embodiments. Signals Cp and Cn represent the complementary clock input signals, whereas signals Dp and Dn represent the complementary data input signals. Signals Cout and/Cout represent the complementary clock output signals, whereas signals Dout and /Dout represent the complementary data output signals. As shown in FIG. 3, the data value latched by the corresponding receiver changes at both rising and falling clock edges (e.g., the D-PHY output is dual data rate). At the first clock edge (at time t1) when/Cout makes a transition from low to high and Cout transitions from high to low, Dout is high and /Dout is low, which results in transferring a logic "1" bit at the receiver. At the second clock transition (at time t2) when/Cout transitions from high to low and Cout transitions from low to high, Dout remains high and /Dout remains low, which results in transferring another logic "1" bit at the receiver. At the third clock transition (at time t3), Dout is driven low and /Dout is driven high, which results in transferring a logic "0" bit at the receiver. At the fourth clock transition (at time t4), Dout remains low and /Dout remains high, which results in transferring another logic "0" bit at the receiver, and so on. The result when Dout is greater than/Dout is referred to as a D-PHY high state, whereas the result when Dout is less than/Dout is referred to as a D-PHY low state. The data bit sequence shown in FIG. 3 is merely illustrative.

Figure 4:
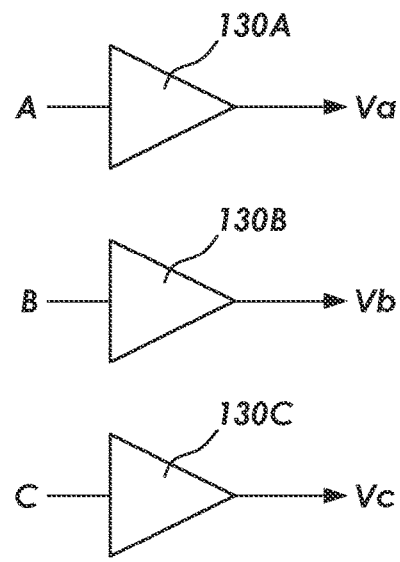
FIG. 4 is a block diagram of illustrative C-PHY trio circuit in accordance with some embodiments.

In contrast, C-PHY uses three signals to transfer data. Unlike D-PHY, C-PHY embeds the clock signal into the data stream, so a separate clock lane is unnecessary. For instance, C-PHY uses encoded data to pack approximately 2.28 bits/symbol while D-PHY does not employ any data encoding. FIG. 4 is a block diagram of illustrative C-PHY trio circuit in accordance with some embodiments. As shown in FIG. 4, the C-PHY trio circuit can include a first driver 130A configured to receive input signal A and to generate a corresponding first output voltage Va, a second driver 130B configured to receive input signal B and to generate a corresponding second output voltage Vb, and a third driver 130C configured to receive input signal C and to generate a corresponding third output voltage Vc.

Signals Va, Vb, and Vc, sometimes referred to collectively as a trio", can be fed to a corresponding C-PHY receiver that includes three differential receiver sub-circuits each monitoring a difference between two of the three signals (Va-Vb), (Vb-Vc), and (Vc-Va). The C-PHY encoder guarantees that (i) there is at least one edge or transition per symbol, (ii) the differential input at all three receiver sub-circuits is non-zero, and (iii) the common mode of all three signals is constant. These conditions can be achieved by restricting the combination of the transmitted signals during any single unit interval (UI) to a high state, mid state, and a low state and by keeping the voltage level on each of the three signals Va, Vb, and Vc different at any point in time. Moreover, the C-PHY interface should also toggle between different wire states as it transitions from symbol to symbol (e.g., the wire state should not stay constant for two consecutive symbols). Due to these restrictions, there can be five different unique transitions among the six wire states. In other words, each symbol has five possible states, making C-PHY a base-5 data transfer scheme.

Figure 5:
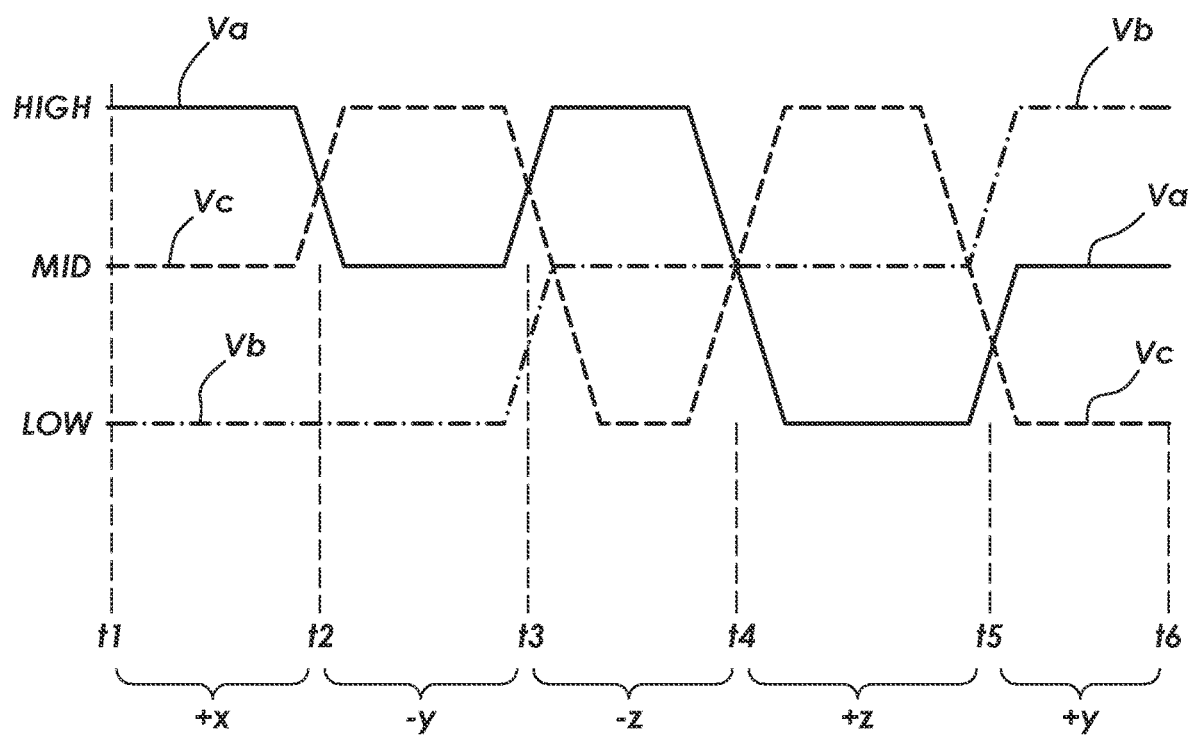
FIG. 5 is a timing diagram illustrating the operation of a C-PHY interface in accordance with some embodiments.

FIG. 5 is a timing diagram illustrating the operation of a C-PHY interface in accordance with some embodiments. As shown in FIG. 5, each of signals Va, Vb, and Vc can switching among a high state (e.g., the highest voltage level), a low state (e.g., the lowest voltage level), and a mid state (e.g., an intermediate or middle voltage level between the highest voltage level and the lowest voltage level). From time t1 to t2, signal Va is at the high state, signal Vb is at the low state, and signal Vc is at the mid state, which translates or encodes to a first symbol +x. From time t2 to t3, signal Va transitions to the mid state, signal Vb stays at the low state, and signal Vc transitions to the high state, which translates or encodes to a second symbol −y. From time t3 to t4, signal Va transitions to the high state, signal Vb transitions to the mid state, and signal Vc transitions to the low state, which translates or encodes to a third symbol −z. From time t4 to t5, signal Va transitions to the low state, signal Vb stays at the mid state, and signal Vc transitions to the high state, which translates or encodes to a fourth symbol +z. From time t5 to t6, signal Va transitions to the mid state, signal Vb transitions to the high state, and signal Vc transitions to the low state, which translates or encodes to a fifth symbol +y. The sequence of symbols shown in FIG. 5 is merely illustrative.

Modern imaging systems can sometimes require both D-PHY and C-PHY interfaces. One way of supporting both D-PHY and C-PHY interfaces is to employ separate D-PHY and C-PHY drivers. In an imaging device that includes separate D-PHY and C-PHY drivers, having dedicated input-output (I/O) pins for the D-PHY drivers and additional dedicated I/O pins for the C-PHY drivers would dramatically increase pin count and is therefore not feasible. Having separate D-PHY and C-PHY drivers share a common set of I/O pins will impose substantial load on the shared pins, which can dramatically reduce the transfer speed and is therefore also infeasible. It is therefore challenging to design an imaging system that can support both D-PHY and C-PHY driving modes without area or speed penalty.

Figure 6:
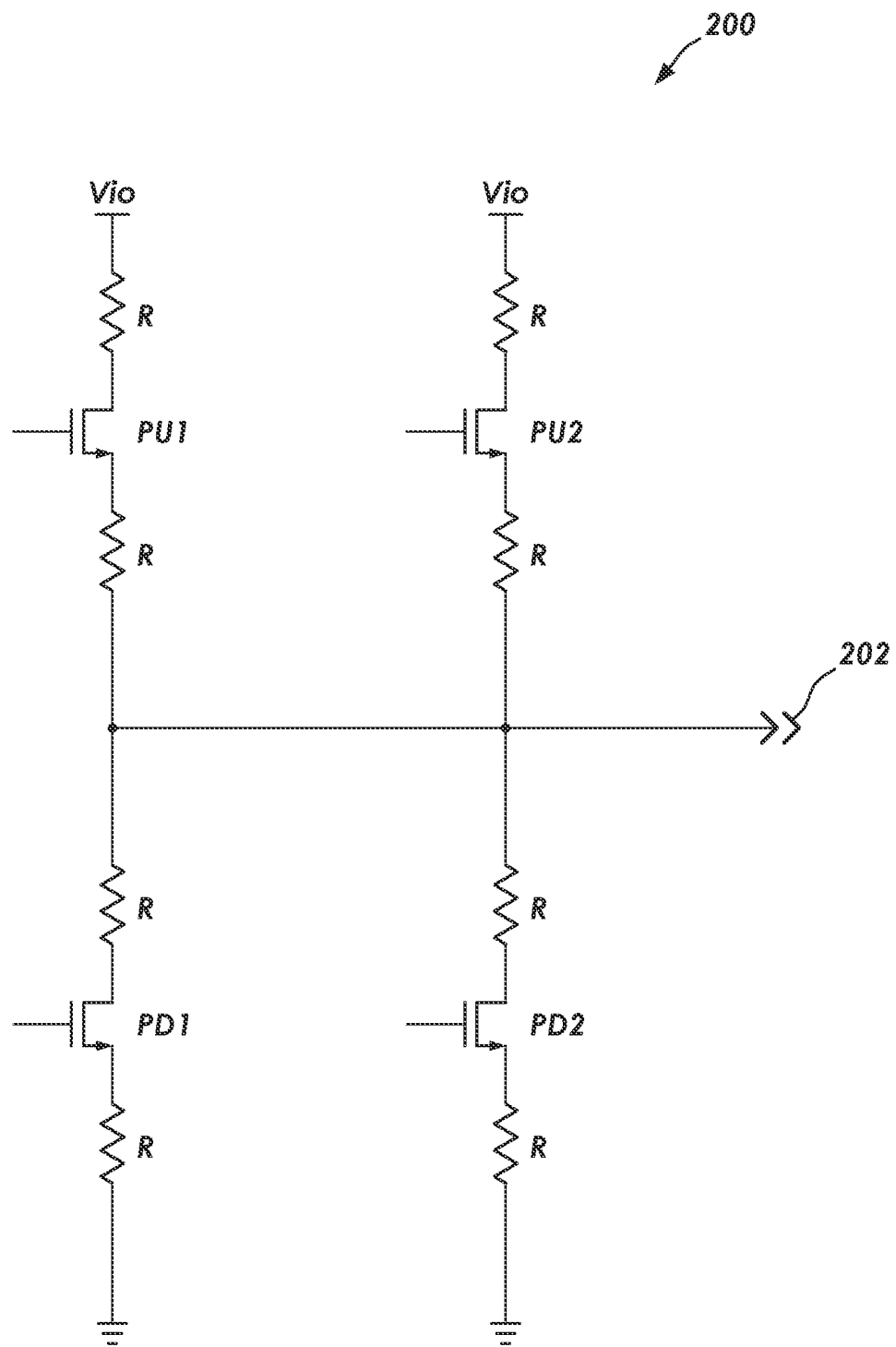
FIG. 6 is a circuit diagram of an illustrative shared half-driver sub-circuit in accordance with some embodiments.

In accordance with an embodiment, a shared driver structure is provided that can support both D-PHY and C-PHY driving modes without additional pins or extra loading on the shared pins. A shared driver operable in both D-PHY and C-PHY modes needs to be able to satisfy the impedance requirements for both driving modes. FIG. 6 is a circuit diagram of an illustrative shared half-driver sub-circuit 200.

Two half-driver sub-circuits 200 driving two separate input-output pins (or pad) form a complete D-PHY unit driver circuit, whereas three half-driver sub-circuits 200 driving three separate input-output pins form a complete C-PHY unit driver circuit. The output impedance of two half-driver sub-circuits 200 should be matched to 50 Ohms (as an example) to match the characteristic impedance of the transmission line that is coupled to those pins. The target driver output impedance of 50 Ohms is merely illustrative. If desired, other target driver output impedance such as 75 Ohms, 100 Ohms, some value less than 50 Ohms, some value greater than 50 Ohms, or other resistance/impedance value can be used.

As shown in FIG. 6, half-driver sub-circuit 200 may include a pull-down path with one or more pull-down transistors and a pull-up path with one or more pull-up transistors. In particular, half-driver sub-circuit 200 can include a first pull-down transistor PD1, a second pull-down transistor PD2, a first pull-up transistor PU1, and a second pull-up transistor PU2. All of the transistors PD1, PD2, PU1, and PU2 within half-driver sub-circuit can be implemented as n-channel metal-oxide-semiconductor (NMOS) transistors. If desired, the pull-up transistors PU1 and PU2 can alternatively be implemented as p-channel metal-oxide-semiconductor (PMOS) transistors. Device configurations in which all of the transistors within sub-circuit 200 are implemented as n-type transistors are sometimes described herein as an example.

The first pull-down transistor PD1 can have a gate terminal, a drain terminal coupled to an input-output (I/O) pad 202 via a first resistor R, and a source terminal coupled to the ground line via a second resistor R. The I/O pad 202 is sometimes referred to as an external pin. The second pull-down transistor PD2 can have a gate terminal, a drain terminal coupled to I/O pad 202 via a third resistor R, and a source terminal coupled to the ground line via a fourth resistor R. The first pull-up transistor PU1 can have a gate terminal, a source terminal coupled to I/O pad 202 via a fifth resistor R, and a drain terminal coupled to a power supply line via a sixth resistor R. Driver supply voltage Vio, sometimes referred to as the input-output interface power supply voltage, can be provided on the power supply line. The second pull-up transistor PU2 can have a gate terminal, a source terminal coupled to I/O pad 202 via a seventh resistor R, and a drain terminal coupled to the power supply line via an eighth resistor R.

Consider, as an example, that the half-driver sub-circuit 200 has an output impedance that is matched to 50 Ohms. This 50 Ohm output impedance can be realized by setting the resistance value of all eight resistors R within half-driver sub-circuit 200 to 45 Ohms while setting the on-resistance of each transistor PD1, PD2, PU1, and PU2 to 10 Ohms. These values are merely illustrative. In general, the resistance values of each component within shared half-driver sub-circuit 200 can have other suitable values. A higher MOS transistor switch impedance will reduce the overall driver area at the expense of linearity. Conversely, a lower MOS transistor impedance can provide improved linearity performance at the cost of increased driver area. If desired, other resistance values for the resistors R can be used, and each of the four transistors can be configured to provide other on-resistance values. The resistance values for each of the resistors R can be the same or can be different. The on-resistance values for each of the pull-up and pull-down transistors can be the same or can be different.

Figure 7:
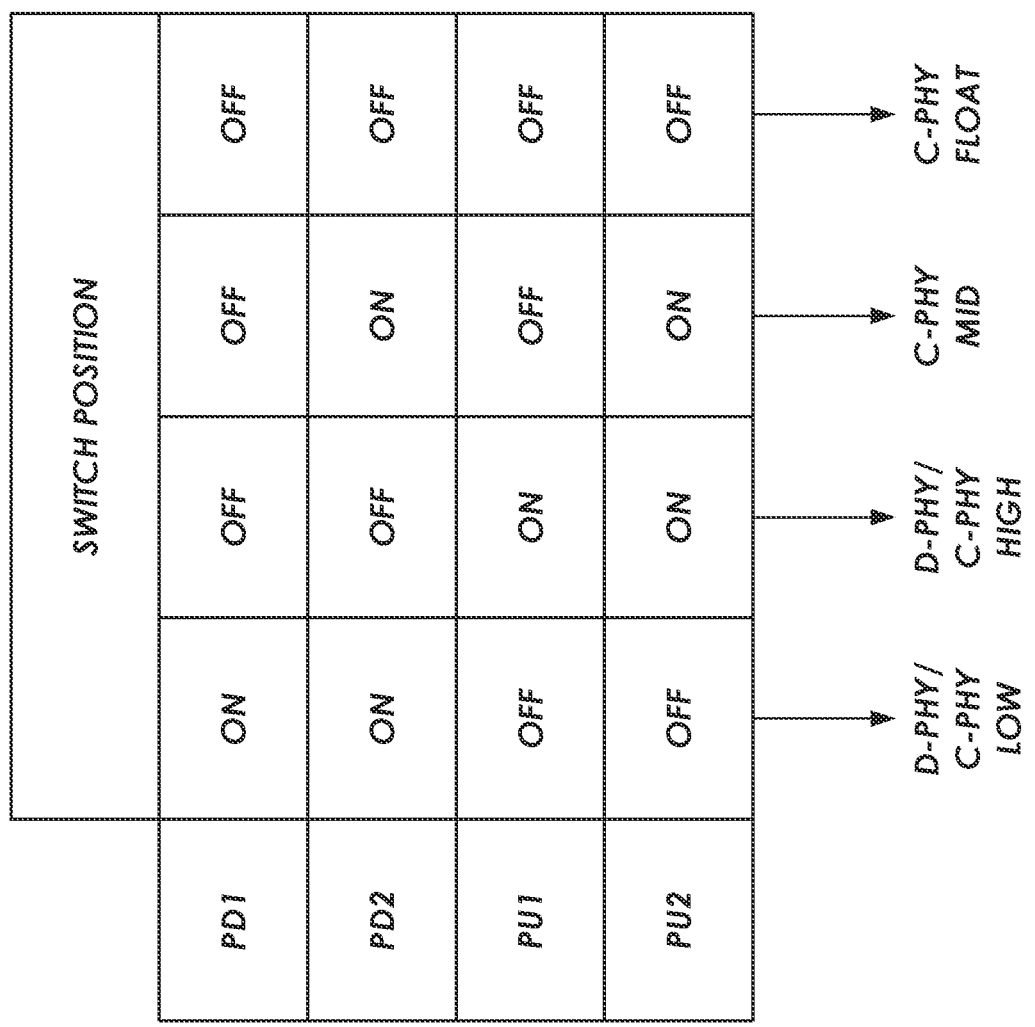
FIG. 7 is a table showing various half-driver switch positions in different D-PHY/C-PHY states in accordance with some embodiments.

FIG. 7 is a table showing various half-driver switch positions in different D-PHY and C-PHY states in accordance with some embodiments. In a first switch arrangement, the pull-down transistors PD1 and PD2 can be turned on (activated) while the pull-up transistors are turned off (deactivated). In this configuration, the pull-down transistors PD1 and PD2 can provide a 50 Ohm pull-down path to support the D-PHY low state and the C-PHY low state. In a second switch arrangement, the pull-down transistors PD1 and PD2 can be turned off while the pull-up transistors are turned on. In this configuration, the pull-up transistors PU1 and PU2 can provide a 50 Ohm pull-up path to support the D-PHY high state and the C-PHY high state. In a third switch arrangement, one of the pull-down transistors (e.g., only PD2 but not PD1) can be activated while one of the pull-up transistors (e.g., only PU2 but not PU1) is activated. In this configuration, a 100 Ohm pull-down path can be provided through pull-down transistor PD2 and a 100 Ohm pull-up path can be simultaneously provided through pull-up transistor PU2 to support the C-PHY mid state. In a fourth switch arrangement, all of the transistors PD1, PD2, PU1, and PU2 can be deactivated (disabled). This configuration can correspond to a C-PHY floating state. The C-PHY float state is sometimes referred to as a high impedance state.

Figure 8:
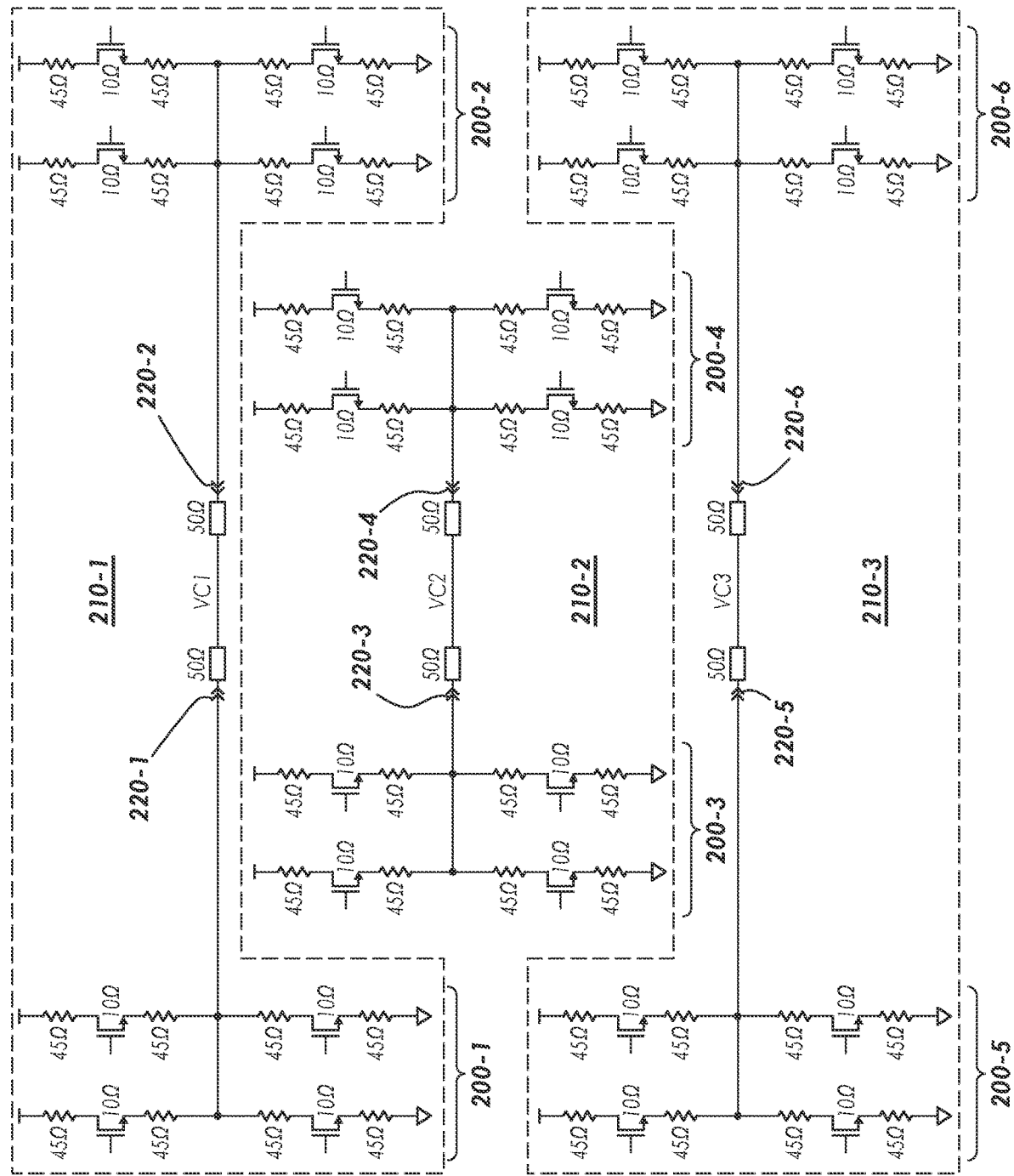
FIG. 8 is a diagram showing how six half-driver sub-circuits can be grouped into three D-PHY driver circuits in accordance with some embodiments.

FIG. 8 is a diagram showing a group of six half-driver sub-circuits 200. The group of half-driver sub-circuits 200 can be paired up to form respective D-PHY drivers. As shown in FIG. 8, a first half-driver sub-circuit 200-1 can be paired up with a second half-driver sub-circuit 200-2 to form a first (full) D-PHY driver circuit 210-1. The first half-driver sub-circuit 200-1 drives a first I/O pad 220-1 terminated by a 50 Ohm resistance at a corresponding receiver, whereas the second half-driver sub-circuit 200-2 drives a second I/O pad 220-2 terminated by a 50 Ohm resistance at the receiver. Voltage VC1 represents the common mode voltage of the two pads at the receiver. A third half-driver sub-circuit 200-3 can be paired up with a fourth half-driver sub-circuit 200-4 to form a second (full) D-PHY driver circuit 210-2. The third half-driver sub-circuit 200-3 drives a third I/O pad 220-3 terminated by a 50 Ohm resistance at the receiver, whereas the fourth half-driver sub-circuit 200-4 drives a fourth I/O pad 220-4 terminated by a 50 Ohm resistance at the receiver. Voltage VC2 represents the common mode voltage of the two pads at the receiver.

A fifth half-driver sub-circuit 200-5 can be paired up with a sixth half-driver sub-circuit 200-6 to form a third (full) D-PHY driver circuit 210-3. The fifth half-driver sub-circuit 200-5 drives a fifth I/O pad 220-5 terminated by a 50 Ohm resistance at the receiver, whereas the sixth half-driver sub-circuit 200-6 drives a sixth I/O pad 220-6 terminated by a 50 Ohm resistance at the receiver. Voltage VC3 represents the common mode voltage of the two pads at the receiver. The transistors in each full D-PHY driver can be configured in accordance with the switch positions shown in FIG. 7 to support the various D-PHY driving states. In other words, the six half-driver sub-circuits 200 can be combined to operate as three separate D-PHY driver units with the desired impedance and high/low driving state requirements.

Figure 9:
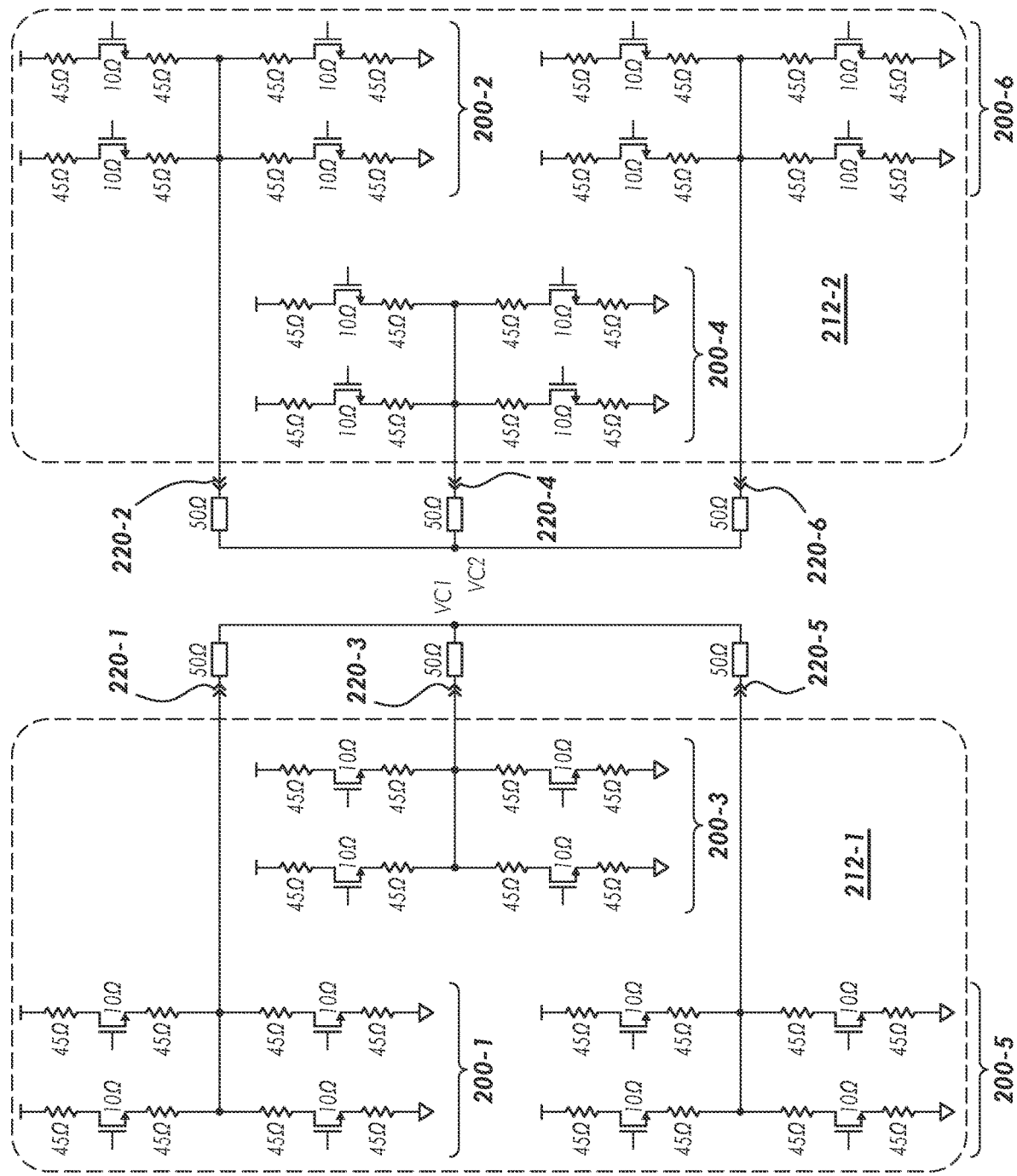
FIG. 9 is a diagram showing how six half-driver sub-circuits can be grouped into two C-PHY trio driver circuits in accordance with some embodiments.

FIG. 9 is a diagram showing how the same group of six half-driver sub-circuits 200 can be alternatively configured to support the C-PHY driving mode. In particular, three half-driver sub-circuits 200 can be grouped together to form respective C-PHY drivers. As shown in FIG. 9, half-driver sub-circuits 200-1, 200-3, and 200-5 can be coupled together to form a first (full)C-PHY driver circuit 212-1 to drive three corresponding I/O pads 220-1, 220-3, and 220-5 each terminated by 50 Ohms at the corresponding receiver. Voltage VC1 represents the common mode voltage of the three pads at the receiver. Similarly, the other half-driver sub-circuits 200-2, 200-4, and 200-6 can be coupled together to form a second (full)C-PHY driver circuit 212-2 to drive three corresponding I/O pads 220-2, 220-4, and 220-6 each terminated by 50 Ohms at the receiver. Voltage VC2 represents the common mode voltage of those three pads at the receiver. The transistors in each full C-PHY driver can be configured in accordance with the switch positions shown in FIG. 7 to support the various C-PHY driving states. In other words, the six half-driver sub-circuits 200 can be combined to operate as two separate C-PHY driver units with the desired impedance and high/low/mid/float driving state requirements.

In general, an imaging module or image sensor can therefore include multiples of six half-driver sub-circuits 200, where each group of six half-driver sub-circuits 200 can be configured to operate as three D-PHY drivers or two C-PHY trio drivers while satisfying the desired impedance requirements in all of the various driving states. Constructing D-PHY and C-PHY drivers from groups of shared half-driver sub-circuits 200 of the type described in connection with FIG. 6 can be technically advantageous since this architecture does not require extra pads/pins and does not present extra loading on the pads/pins compared to conventional approaches that require separate standalone D-PHY and C-PHY drivers.

D-PHY and C-PHY driving modes can also have different equalization requirements. Signal equalization can include emphasis operations, which involves boosting the high-frequency content of a signal, and de-emphasis operations, which involves reducing the high-frequency content of a signal. To satisfy the different equalization requirements in the various states of the D-PHY and C-PHY driving modes, each 50 Ohm pull-up path and each 50 Ohm pull-down path can be divided into m slices or m parallel branches each having a resistance of m*50 Ohms. A 50 Ohm target impedance is used here for exemplary purposes, but other target resistance values can be employed if desired.

Figure 10:
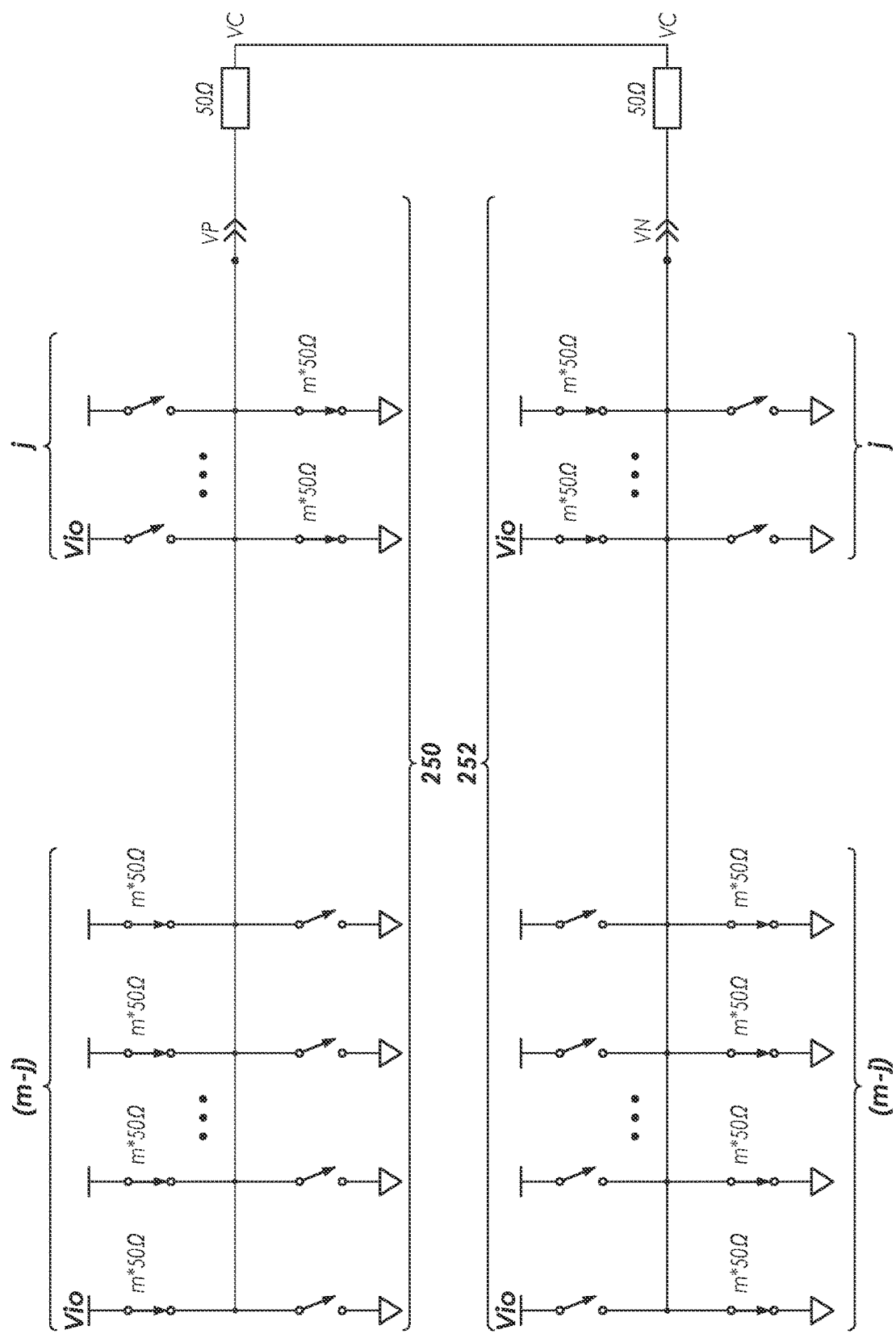
FIG. 10 is a diagram showing an illustrative equalization scheme for a D-PHY driver circuit in accordance with some embodiments.

FIG. 10 is a diagram showing an illustrative equalization scheme for a D-PHY driver circuit in accordance with some embodiments. As shown in FIG. 10, D-PHY driver sub-circuit 250 is configured to drive output voltage VP and has m total slices (branches), including j slices driving in the opposite direction. Similarly, D-PHY driver sub-circuit 252 is configured to drive output voltage VN and also has m total slices, including j slices driving in the opposite direction. When the D-PHY driver is operating in high equalization state, (m−j) slices will be pulling the pad high, whereas j slices will be pulling the pad low. Conversely, when the D-PHY driver is operating in the low equalization state, (m−j) slices will be pulling the pad low, whereas j slices will be pulling the pad high in the opposite direction. The common mode voltage Vc at the external pad is equal to Vio/2. The term slice can refer to and be defined herein as a current path that includes one or more switches.

The number of slices operating in the opposing direction (j) can be computed based on the desired equalization requirement for the D-PHY mode using the following equations:

$$EQ\_DPHY\_TX1 = -20\log\left(1 - \frac{2j_1}{m}\right) \quad (1)$$

$$EQ\_DPHY\_TX2 = -20\log\left(1 - \frac{2j_2}{m}\right) \quad (2)$$

Where EQ_DPHY_TX1 represents the equalization requirement for a first D-PHY transmit mode (e.g., a high gain transmit mode), where EQ_DPHY_TX2 represents the equalization requirement for a second D-PHY transmit mode (e.g., a low gain transmit mode), where $j_1$ represents the number of slices in the opposing direction for the first high-gain D-PHY transmit mode, and where $j_2$ represents the number of slices in the opposite direction for the second low-gain D-PHY transmit mode. As an example, EQ_DPHY_TX1 can be in the range of 2.5 to 4.5 dB, whereas EQ_DPHY_TX2 can be in the range of 6-8 dB. In general, the total number of slices m can be equal to 10, 12, 14, greater than 9, greater than 8, greater than 7, less than 11, less than 12, less than 13, less than 14, less than 15, less than 20, 10-14, 8-16, an even integer to balance the pull-up and pull-down sides to keep the common-mode mode constant across different equalized states, or other suitable range. As examples, $j_1$ can be equal to 1, 2, 3, 1 to 2, 1 to 3, or other suitable integer value less than m. As examples, $j_2$ is generally greater than $j_1$ and can be equal to 2, 3, 4, 5, 2 to 4, greater than 2, greater than 3, or other suitable integer value less than m.

Figure 11:
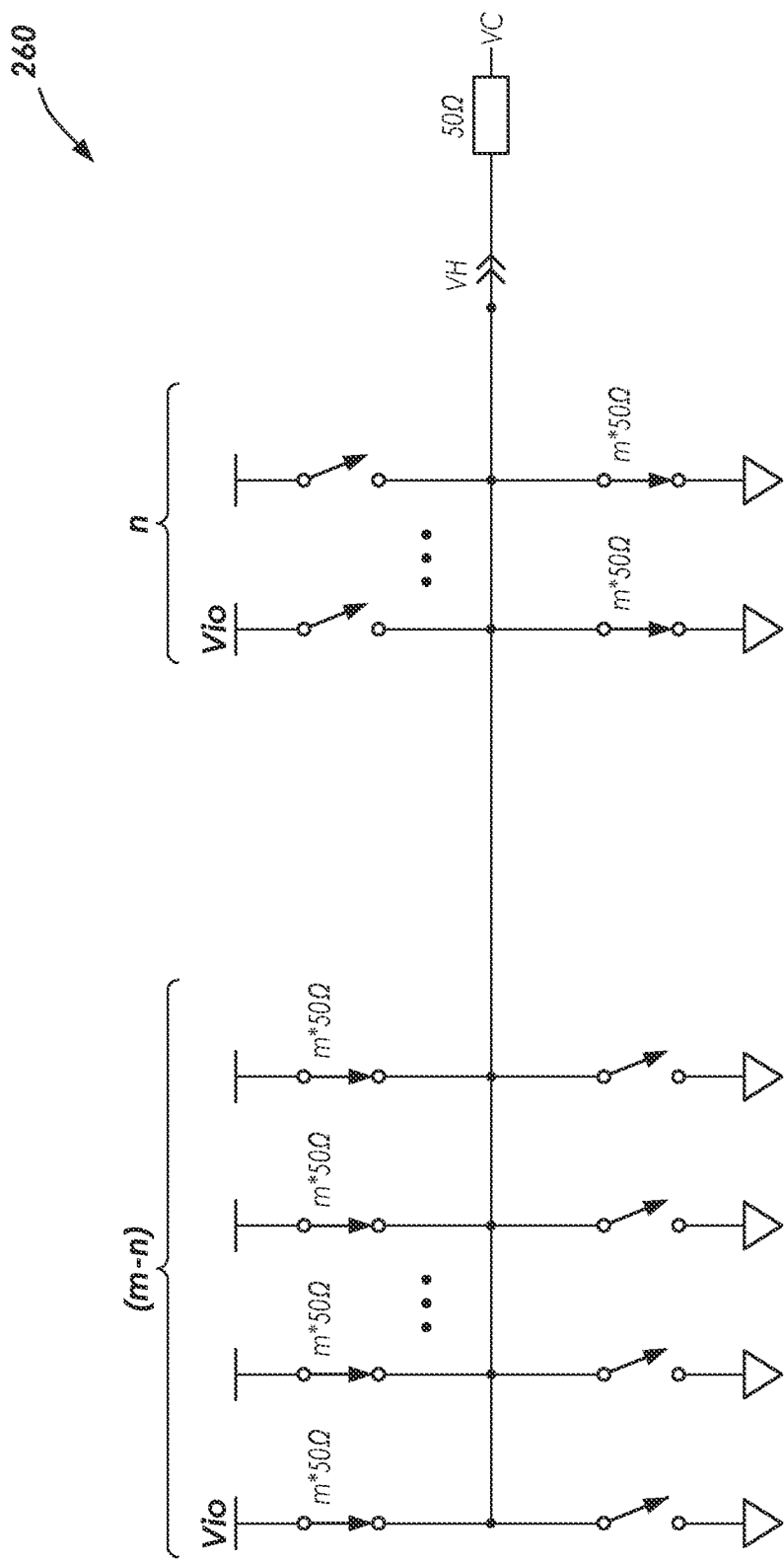
FIG. 11 is a diagram showing an illustrative equalization scheme for a half-driver circuit configured in a C-PHY high state in accordance with some embodiments.

FIG. 11 is a diagram showing an illustrative equalization scheme for a C-PHY driver sub-circuit 260 in accordance with some embodiments. As shown in FIG. 11, C-PHY driver sub-circuit 260 is configured to drive C-PHY high state output voltage VH and has m total slices (branches), including n slices driving in the opposite direction. When the C-PHY sub-circuit 260 is operating in the high equalization state, (m−n) slices will be pulling the pad high, whereas the n remaining slices will be pulling the pad low. The common mode voltage Vc at the external pad is equal to Vio/2.

The number of slices operating in the opposing direction (n) for C-PHY sub-circuit 260 described in connection with FIG. 11 can be computed based on the desired equalization requirement for the C-PHY mode using the following equations:

$$EQ\_H1 = -20\log\left(1 - \frac{2n}{m}\right) \quad (3)$$

$$EQ\_H0 = -20\log\left(1 - \frac{4n}{m}\right) \quad (4)$$

Where EQ_H1 and EQ_H0 represent different equalization requirements taken from the MIPI specification. For the H0 equalization scenario, 2*n slices can be operated in the opposing direction. As an example, EQ_H1 can be equal to 1.75 dB, whereas EQ_H0 can be equal to 3.5 dB. In general, the total number of slices m can be equal to 10, 12, 14, greater than 9, greater than 8, greater than 7, less than 11, less than 12, less than 13, less than 14, less than 15, less than 20, 10-14, 8-16, an even integer to balance the pull-up and pull-down sides to keep the common-mode mode constant across different equalized states, or other suitable range. As examples, k can be equal to 1, 2, 3, 1 to 2, 1 to 3, or other suitable integer value less than m.

Figure 12:
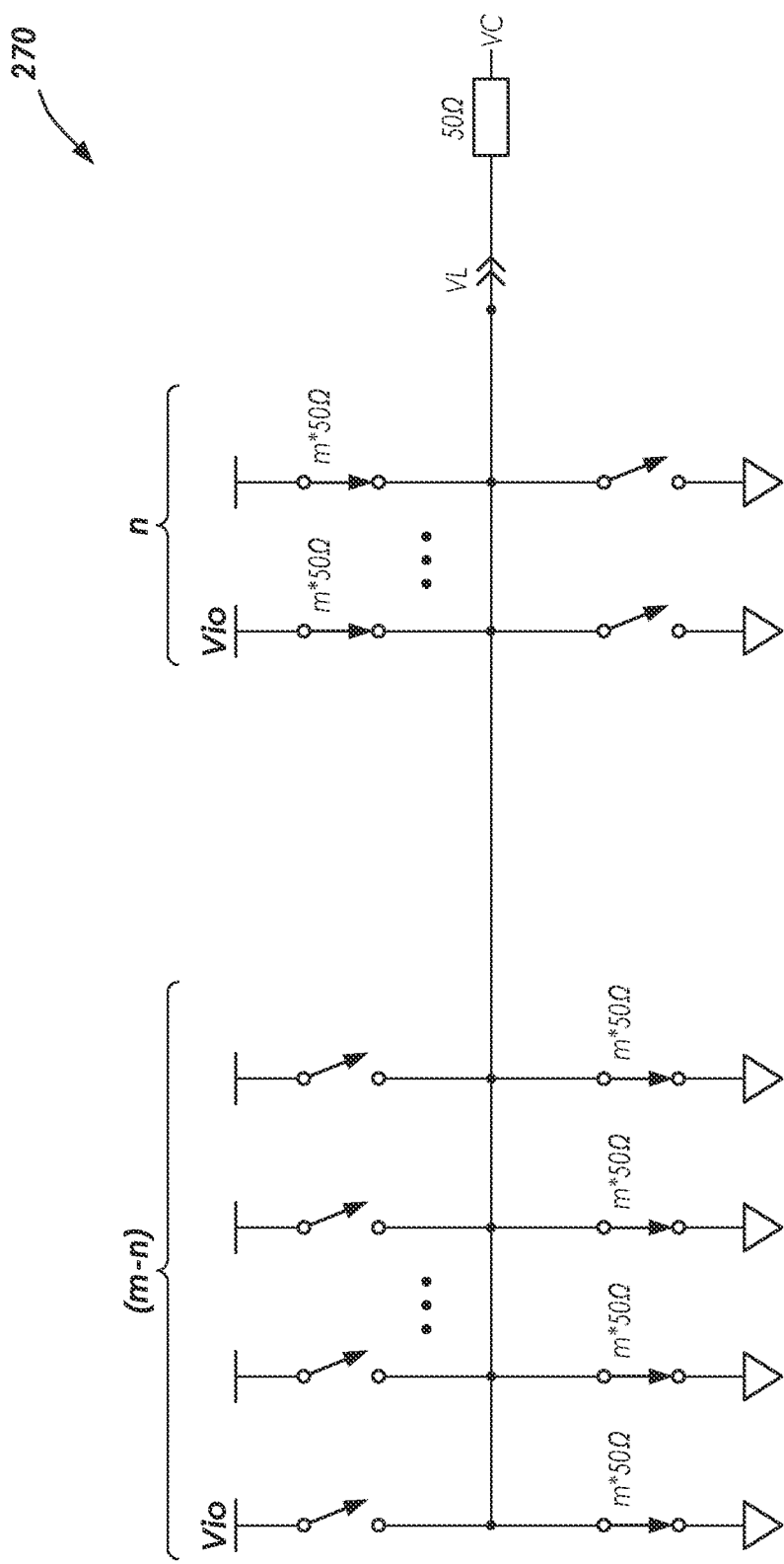
FIG. 12 is a diagram showing an illustrative equalization scheme for a half-driver circuit configured in a C-PHY low state in accordance with some embodiments.

FIG. 12 is a diagram showing an illustrative equalization scheme for a C-PHY driver sub-circuit 270 in accordance with some embodiments. As shown in FIG. 12, C-PHY driver sub-circuit 270 is configured to drive C-PHY low state output voltage VL and has m total slices (branches), including n slices driving in the opposite direction. When the C-PHY sub-circuit 270 is operating in the low equalization state, (m−n) slices will be pulling the pad low, whereas the n remaining slices will be pulling the pad high. The common mode voltage Vc at the external pad should be equal to Vio/2.

The number of slices operating in the opposing direction (n) for C-PHY sub-circuit 270 described in connection with FIG. 12 can be computed based on the desired equalization requirement for the C-PHY mode using the following equations:

$$EQ\_L1 = -20\log\left(1 - \frac{2n}{m}\right) \quad (5)$$

$$EQ\_L0 = -20\log\left(1 - \frac{4n}{m}\right) \quad (6)$$

Where EQ_L1 and EQ_L0 represent different equalization requirements taken from the MIPI specification. For the L0 equalization scenario, 2*n slices can be operated in the opposite direction. As an example, EQ_L1 can be equal to 1.75 dB, whereas EQ_L0 can be equal to 3.5 dB. In general, the total number of slices m can be equal to 10, 12, 14, greater than 9, greater than 8, greater than 7, less than 11, less than 12, less than 13, less than 14, less than 15, less than 20, 10-14, 8-16, an even integer to balance the pull-up and pull-down sides to keep the common-mode mode constant across different equalized states, or other suitable range. As examples, n can be equal to 1, 2, 3, 1 to 2, 1 to 3, or other suitable integer value less than m.

Figure 13:
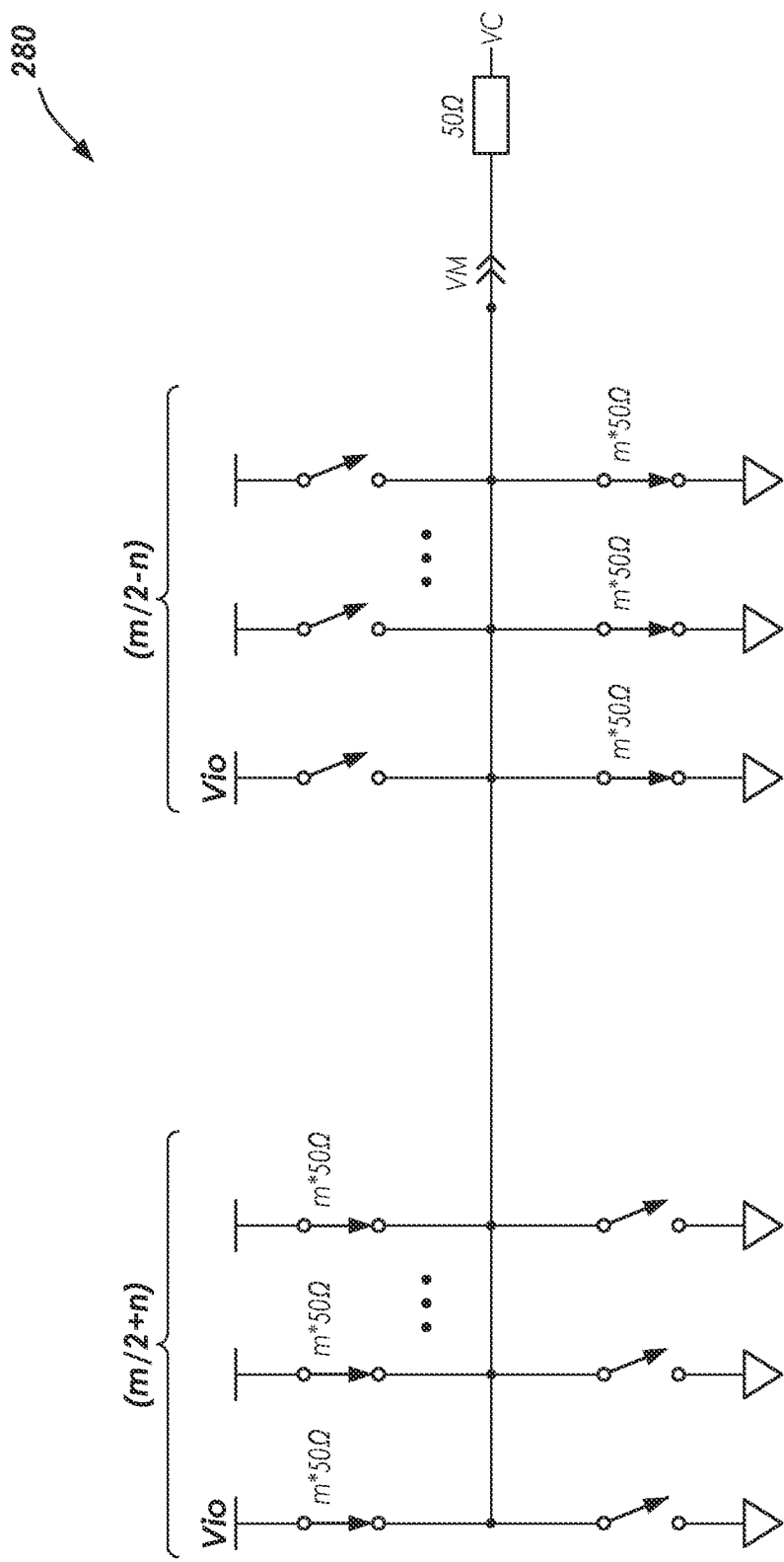
FIG. 13 is a diagram showing an illustrative equalization scheme for a half-driver circuit configured in a C-PHY mid state in accordance with some embodiments.

FIG. 13 is a diagram showing an illustrative equalization scheme for a C-PHY driver sub-circuit 280 in accordance with some embodiments. As shown in FIG. 13, C-PHY driver sub-circuit 280 is configured to drive C-PHY mid state output voltage VM and has m total slices (branches). Circuit 280 can be operable in a first mid state M0, a second mid state M1+, and a third mid state M1−. For the first mid state M0, m/2 slices will be pulling VM at the external pad low whereas an equal number of m/2 slices will be pulling VM high. For the second mid state M1+, (m/2+n) slices will be pulling VM at the external pad high whereas a different number of (m/2−n) slices will be pulling VM low. For the third mid state M1−, (m/2+n) slices will be pulling VM at the external pad low whereas a different number of (m/2−n) slices will be pulling VM high. The common mode voltage Vc at the external pad should be equal to Vio/2.

The number of slices operating in the opposing direction (n) for C-PHY sub-circuit 280 described in connection with FIG. 13 can be computed based on the desired equalization requirement for the C-PHY mode using the following equations:

$$EQ\_M1 += -20\log\left(1 - \frac{2n}{m}\right) \quad (7)$$

$$EQ\_M1 -= -20\log\left(1 - \frac{2n}{m}\right) \quad (8)$$

Where EQ_M1+ represents the mid state equalization requirement for the M1+ state, and EQ_M1− represents the mid state equalization requirement for the M1− state. As an example, EQ_M1+ and/or EQ+M1− can be equal to 1.75 dB or other suitable values. In general, the total number of slices m can be equal to 10, 12, 14, greater than 9, greater than 8, greater than 7, less than 11, less than 12, less than 13, less than 14, less than 15, less than 20, 10-14, 8-16, an even integer to balance the pull-up and pull-down sides to keep the common-mode mode constant across different equalized states, or other suitable range. As examples, n can be equal to 1, 2, 3, 1 to 2, 1 to 3, or other suitable integer value less than m.

The embodiments of FIGS. 10-13 are not mutually exclusive with the shared half-driver sub-circuit embodiments of FIGS. 6-9. In other words, the various slices shown in FIG. 10-13 can be implemented using the shared half-driver sub-circuit structure described above in connection with FIG. 6. The D-PHY and C-PHY drivers of the type described in connection with FIGS. 10-13 can support both D-PHY equalization and non-equalization modes, both C-PHY equation and non-equalization modes, and can also support a low speed C-PHY floating mode. This equalization scheme can maintain the desired equalization across process, voltage, and temperature (PVT) variations without requiring any additional trim bits. Increasing the total number of slices (m) can help provide better tunability for the equalization levels.

For the same set of image data, serial data transmitted via a D-PHY interface will be different than the serial data transmitted via a D-PHY interface. It would be desirable for the shared half-driver sub-circuit structure of the type described above in connection with FIGS. 6-9 to be able to reuse the same serializer (e.g., the same high-level data path) in both D-PHY and C-PHY driving modes. The term "serializer" used herein may generally refer to a chain of digital flip-flop circuits, sometimes also referred to as a serial data path.

Figures 14A, 14B:
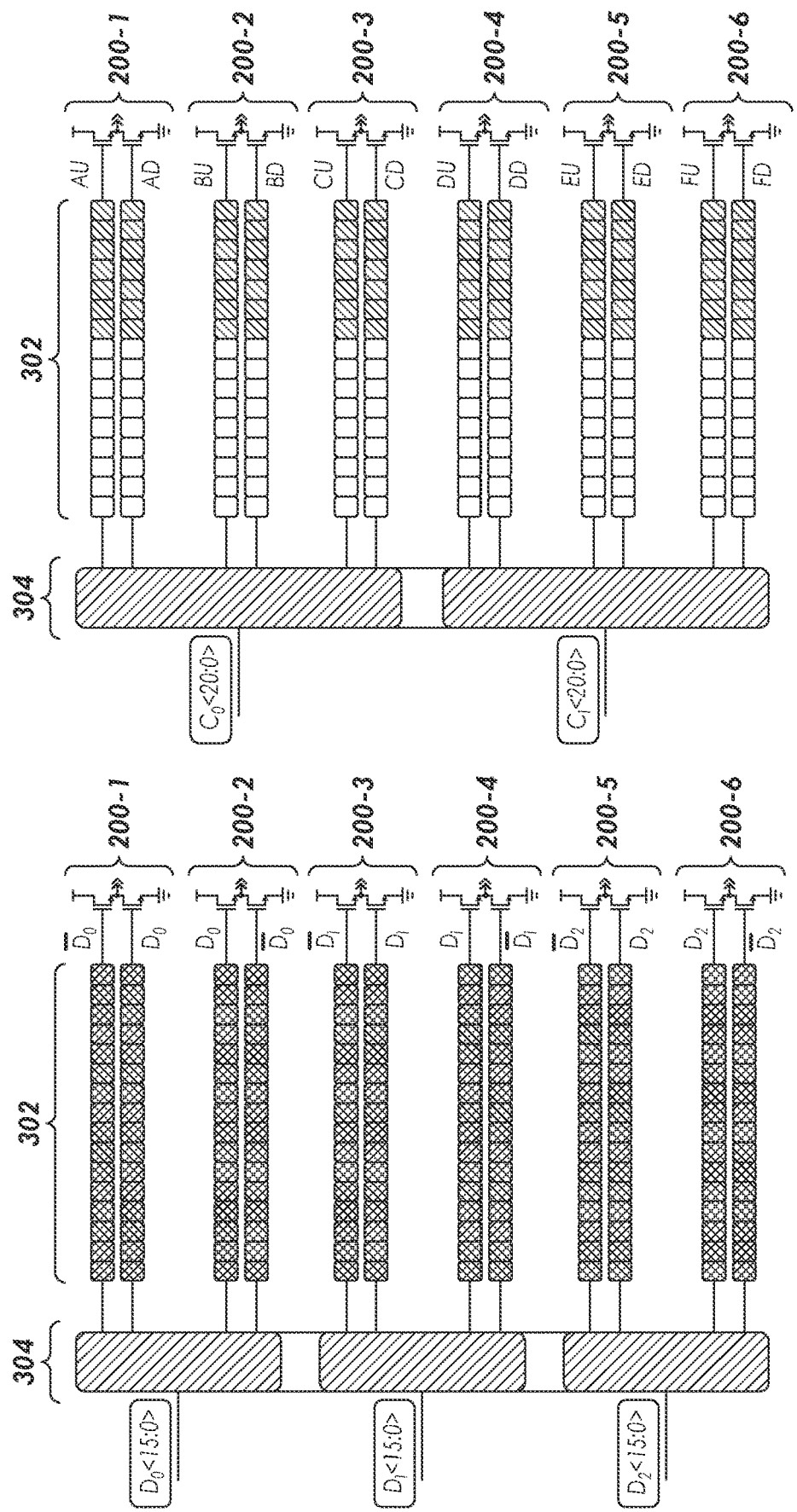
FIG. 14A is a diagram of a shared data path with multiple 16-bit serializers configured in D-PHY mode in accordance with some embodiments.
FIG. 14B is a diagram of the shared data path of FIG. 14A configured in C-PHY mode in accordance with some embodiments.

FIGS. 14A and 14B illustrate a first data path architecture that can be used for both D-PHY and C-PHY modes. In general, the D-PHY raw data is transmitted in groups of 16-bit parallel data, each of which can be used to drive two D-PHY half-driver sub-circuits via four separate serializers. FIG. 14A shows an example where a 48-bit parallel data is used to drive three corresponding D-PHY drivers, which are composed of six half-driver sub-circuits 200-1, 200-2, 200-3, 200-4, 200-5, and 200-6. Although the six half-driver sub-circuits 200 of FIGS. 14A and 14B are shown as including one pull-up transistor and one pull-down transistor, this is merely illustrative and each half-driver sub-circuit 200 can have a circuit structure shown in FIG. 6, can be combined within one or more half-drivers to form D-PHY drivers as shown in FIG. 8, can be combined with one or more half-drivers to form C-PHY drivers as shown in FIG. 9, and/or can be operated to support the various equalization schemes as described in connection with FIGS. 10-13.

As shown in FIG. 14A, a first group of 16-bit parallel data $D_0$<15:0> is fed through a first combinational logic circuit 304, which converts the D-PHY parallel data to serial pre-driver input bits. For the D-PHY mode, combinational logic 304 generates complementary signals for the pull-up and pull-down switches for half-driver sub-circuits 200-1 and 200-2. The pull-up switch(es) in half-driver sub-circuit 200-1 can receive inverted data bits/$D_0$ via a first 16-bit serializer 302, whereas the pull-down switch(es) in half-driver sub-circuit 200-1 can receive non-inverted data bits $D_0$ via a second 16-bit serializer 302. The pull-up switch(es) in half-driver sub-circuit 200-2 can receive non-inverted data bits $D_0$ via a third 16-bit serializer 302, whereas the pull-down switch(es) in half-driver sub-circuit 200-2 can receive inverted data bits/$D_0$ via a fourth 16-bit serializer 302. The data bits can be optionally multiplexed before the serializers, which can ensure better timing match across the various half-drivers, higher overall speeds, and lower skews.

A second group of 16-bit parallel data $D_1$<15:0> is fed through a second combinational logic circuit 304, which generates complementary signals for the pull-up and pull-down switches for half-driver sub-circuits 200-3 and 200-4. The pull-up switch(es) in half-driver sub-circuit 200-3 can receive inverted data bits/$D_1$ via a fifth 16-bit serializer 302, whereas the pull-down switch(es) in half-driver sub-circuit 200-3 can receive non-inverted data bits $D_1$ via a sixth 16-bit serializer 302. The pull-up switch(es) in half-driver sub-circuit 200-4 can receive non-inverted data bits $D_1$ via a seventh 16-bit serializer 302, whereas the pull-down switch(es) in half-driver sub-circuit 200-4 can receive inverted data bits/$D_1$ via an eighth 16-bit serializer 302. The data bits can be optionally multiplexed before the serializers, which can ensure better timing match across the various half-drivers, higher overall speeds, and lower skews.

A third group of 16-bit parallel data $D_2$<15:0> is fed through a third combinational logic circuit 304, which generates complementary signals for the pull-up and pull-down switches for half-driver sub-circuits 200-5 and 200-6. The pull-up switch(es) in half-driver sub-circuit 200-5 can receive inverted data bits/$D_2$ via a ninth 16-bit serializer 302, whereas the pull-down switch(es) in half-driver sub-circuit 200-5 can receive non-inverted data bits $D_2$ via a tenth 16-bit serializer 302. The pull-up switch(es) in half-driver sub-circuit 200-6 can receive non-inverted data bits $D_2$ via an eleventh 16-bit serializer 302, whereas the pull-down switch(es) in half-driver sub-circuit 200-6 can receive inverted data bits/$D_2$ via a twelfth 16-bit serializer 302. The data bits can be optionally multiplexed before the serializers, which can ensure better timing match across the various half-drivers, higher overall speeds, and lower skews. This data path architecture can be technically advantageous since no pre-driver logic is needed in the high-speed domain. In the D-PHY mode, all 16 bits in each 16-bit serializer will be fully in use (i.e., all of the flip-flops will be occupied by some data bit).

Unlike D-PHY, the C-PHY raw data is transmitted in groups of 21-bit parallel data, each of which can be used to drive three C-PHY half-driver sub-circuits via six separate serializers. FIG. 14B shows an example where a 42-bit parallel data is used to drive two corresponding C-PHY trios. For example, half-drivers 200-1 and 200-2 are coupled together to form a first C-PHY unit driver; half-drivers 200-3 and 200-4 are coupled together to form a second C-PHY unit driver; and half-drivers 200-5 and 200-6 are coupled together to form a third C-PHY unit driver. These half-driver sub-circuits can have the same or similar C-PHY circuit structure as that shown in FIG. 6, FIG. 9, or FIGS. 11-13.

As shown in FIG. 14B, a first group of 21-bit parallel data $C_0$<20:0> is fed through a first combinational logic circuit 304, which converts the C-PHY parallel data to serial pre-driver input bits. For the C-PHY mode, first combinational logic 304 generates pull-up inputs AU and pull-down inputs AD for the pull-up and pull-down switches in half-driver sub-circuit 200-1, pull-up inputs BU and pull-down inputs BD for the pull-up and pull-down switches in half-driver sub-circuit 200-2, and pull-up inputs CU and pull-down inputs CD for the pull-up and pull-down switches in half-driver sub-circuit 200-3. All of these driver inputs AU, AD, BU, BD, CU, and CD are received via six respective 16-bit serializer 302. The data bits can be optionally multiplexed before the serializers, which can ensure better timing match across the various half-drivers, higher overall speeds, and lower skews.

A second group of 21-bit parallel data $C_1$<20:0> is fed through a second combinational logic circuit 304, which converts the C-PHY parallel data to serial pre-driver input bits. For the second group of C-PHY bits, second combinational logic 304 generates pull-up inputs DU and pull-down inputs DD for the pull-up and pull-down switches in half-driver sub-circuit 200-4, pull-up inputs EU and pull-down inputs ED for the pull-up and pull-down switches in half-driver sub-circuit 200-5, and pull-up inputs FU and pull-down inputs FD for the pull-up and pull-down switches in half-driver sub-circuit 200-6. All of these driver inputs DU, DD, EU, ED, FU, and FD are received via six respective 16-bit serializer 302. The data bits can be optionally multiplexed before the serializers, which can ensure better timing match across the various half-drivers, higher overall speeds, and lower skews.

The C-PHY mode only requires 7-bit serializers. Thus, since this shared/combined data path architecture employs 16-bit serializers to support the D-PHY mode, 9 bits in each of the 16-bit serializers 302 will be unused during the C-PHY mode. Also, as shown in FIG. 14A, half of the 16-bit serializers 302 are sending the same exact data stream and are therefore redundant. For example, the first and fourth 16-bit serializers 302 are both sending inverted data bits/$D_0$, whereas the second the third 16-bit serializers 302 are both sending non-inverted data bits $D_0$. Thus, the shared data path architecture of FIGS. 14A and 14B is able to support both D-PHY and C-PHY driving modes but uses more hardware and consumes extra power.

Figure 15B:
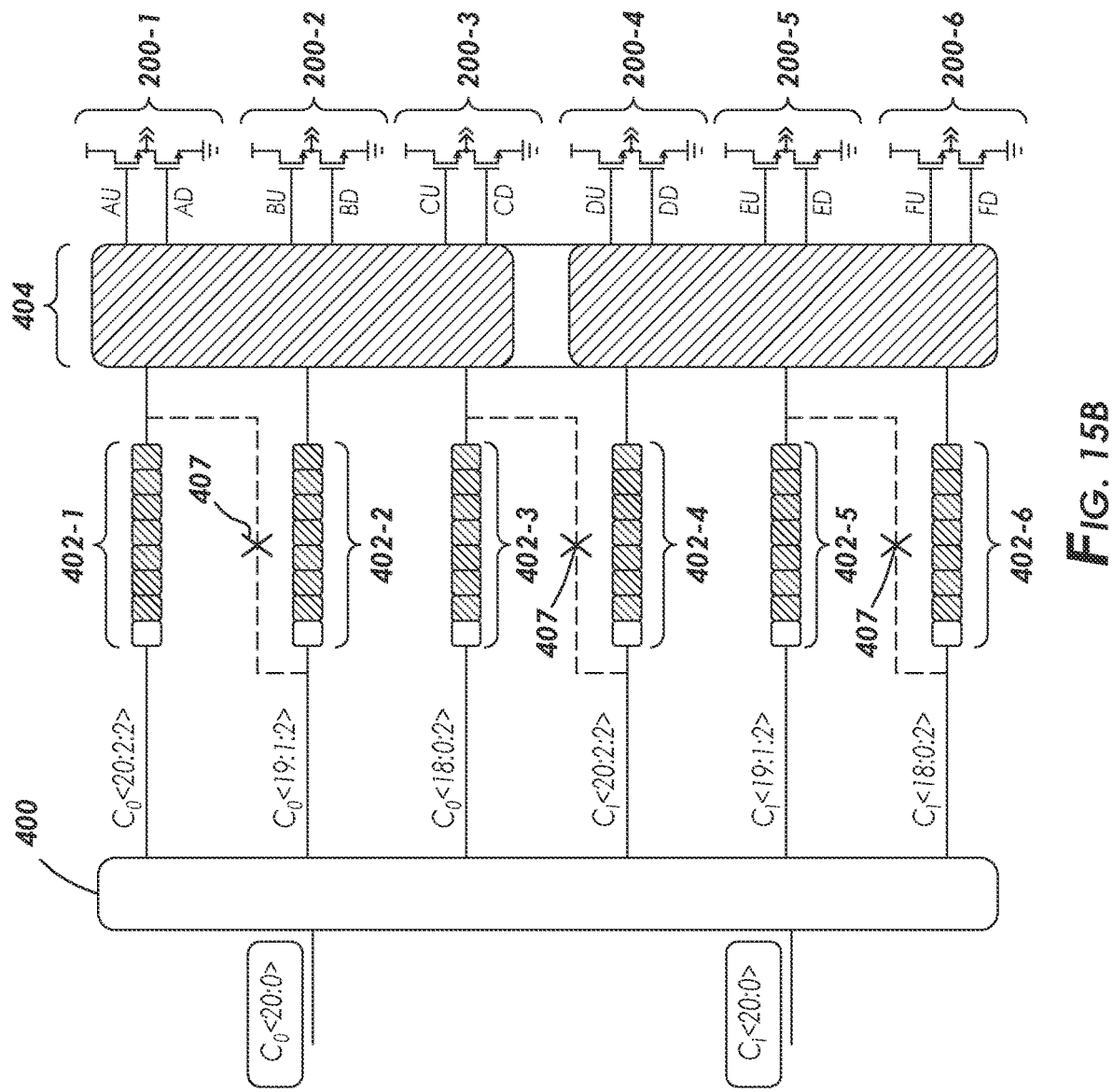
FIG. 15B is a diagram of the shared data path of FIG. 15A configured in C-PHY mode in accordance with some embodiments.

FIGS. 15A and 15B show another shared data path architecture that employs less hardware relative to the embodiment of FIGS. 14A and 14B. FIG. 15A shows an example where a 48-bit parallel data is used to drive three corresponding D-PHY drivers, which are composed of six half-driver sub-circuits 200-1, 200-2, 200-3, 200-4, 200-5, and 200-6. Although the six half-driver sub-circuits 200 of FIGS. 15A and 15B are shown as including one pull-up transistor and one pull-down transistor, this is merely illustrative and each half-driver sub-circuit 200 can have a circuit structure shown in FIG. 6, can be combined within one or more half-drivers to form D-PHY drivers as shown in FIG. 8, can be combined with one or more half-drivers to form C-PHY drivers as shown in FIG. 9, and/or can be operated to support the various equalization schemes as described in connection with FIGS. 10-13. Unlike FIGS. 14A and 14B, the embodiment of FIG. 15A includes only six 8-bit serializers, which is significantly less serializer hardware than FIG. 14A.

A first group of 16-bit parallel data $D_0$<15:0> is fed through an input routing block 400, which routes the parallel bits directly to two 8-bit serializers 402-1 and 402-2 cascaded together via a first lane-crossing path 406-1. Input routing block 400 may be a signal bypass block. The serialized bits output from serializer 402-2 can be fed through a first pre-driver combinational logic circuit 404, which converts the raw D-PHY bits to corresponding pre-driver inputs. For the D-PHY mode, the first pre-driver logic 404 generates complementary signals for the pull-up and pull-down switches for half-driver sub-circuits 200-1 and 200-2.

A second group of 16-bit parallel data $D_1$<15:0> is fed through an input routing block 400, which routes the parallel bits directly to two 8-bit serializers 402-3 and 402-4 cascaded together via a second lane-crossing path 406-2. The serialized bits output from serializer 402-4 can be fed through a second pre-driver combinational logic circuit 404, which converts the raw D-PHY bits to corresponding pre-driver inputs. For the D-PHY mode, the second pre-driver logic 404 generates complementary signals for the pull-up and pull-down switches for half-driver sub-circuits 200-3 and 200-4.

A third group of 16-bit parallel data $D_2<15:0>$ is fed through input routing block 400, which routes the parallel bits directly to two 8-bit serializers 402-5 and 402-6 cascaded together via a third lane-crossing path 406-3. The serialized bits output from serializer 402-6 can be fed through a third pre-driver combinational logic circuit 404, which converts the raw D-PHY bits to corresponding pre-driver inputs. For the D-PHY mode, the third pre-driver logic 404 generates complementary signals for the pull-up and pull-down switches for half-driver sub-circuits 200-5 and 200-6.

Figure 15C:
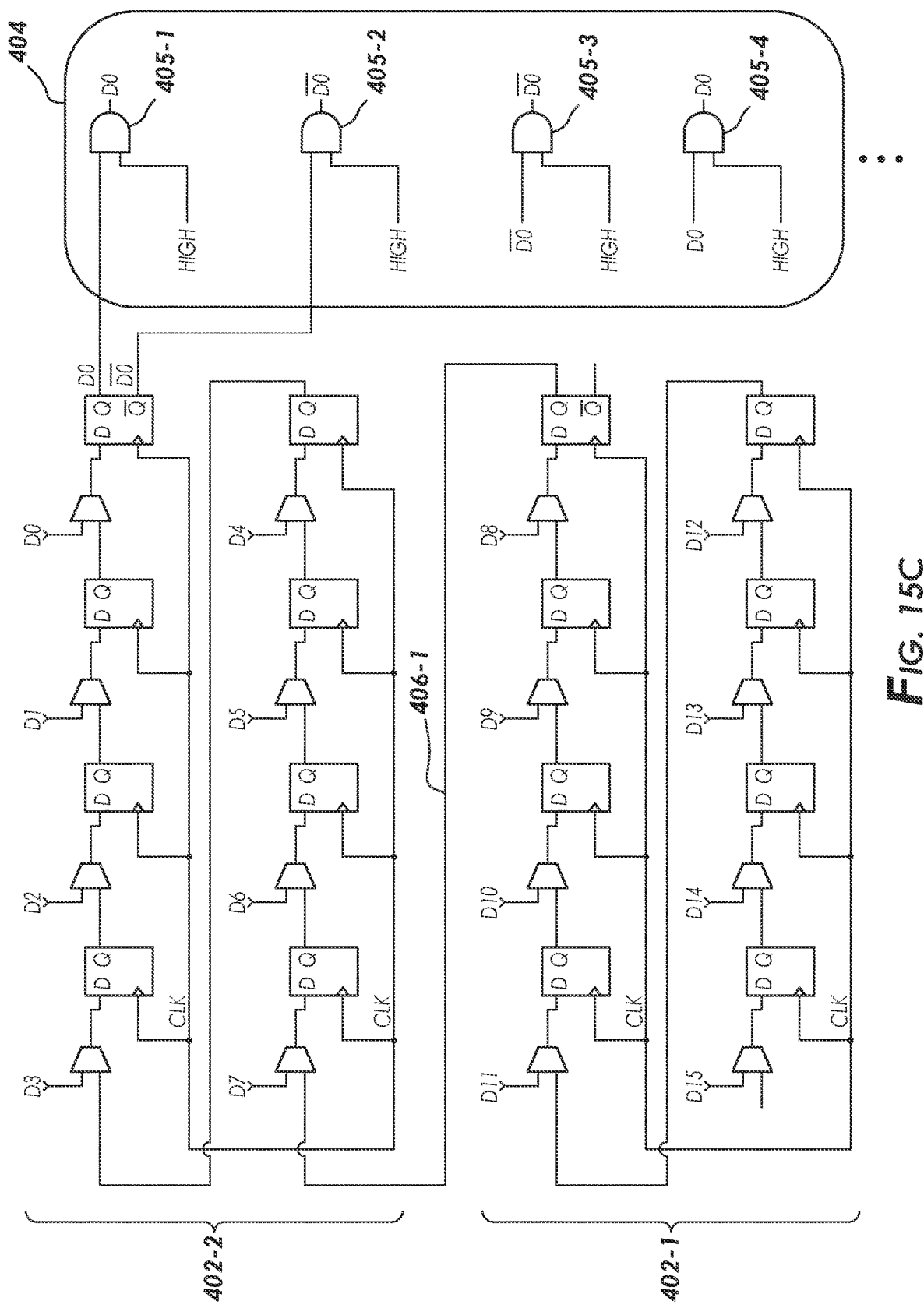
FIG. 15C is a diagram showing how two 8-bit serializers can be combined to produce pre-driver input signals for a D-PHY driver circuit in accordance with some embodiments.

FIG. 15C shows how two 8-bit serializers can be combined to produce pre-driver input signals for a D-PHY driver. In the example of FIG. 15C, first 8-bit serializer 402-1 is connected in series with second 8-bit serializer 402-2 via lane-crossing path 406-1. Each 8-bit serializer includes eight digital flip-flops with multiplexers selectively passing one of the parallel $D_0<15:0>$ bits to the inputs of each flip-flop. The last (trailing) flip-flop in serializer 402-2 has a first output on which $D_0$ is generated and a second output on which inverted/$D_0$ is generated. The pre-driver logic 404 may, for example, include four logic AND gates 405-1, 405-2, 405-3, and 405-4. The first logic AND gate 405-1 may have a first input configured to receive D0, a second input configured to receive a high signal (e.g., logic "1"), and an output on which D0 is generated. The second logic AND gate 405-2 may have a first input configured to receive /D0 (i.e., an inverted version of D0), a second input configured to receive a high signal (e.g., logic "1"), and an output on which /D0 is generated. The third logic AND gate 405-3 may have a first input configured to receive /D0, a second input configured to receive a high signal (e.g., logic "1"), and an output on which /D0 is generated. The fourth logic AND gate 405-4 may have a first input configured to receive D0, a second input configured to receive a high signal (e.g., logic "1"), and an output on which D0 is generated. These four signals can be used to control the pull-up and pull-down switches in a corresponding D-PHY driver (see, e.g., FIG. 15A). The remaining serializers 402-3, 402-4, 402-5, and 402-6 and the corresponding pre-driver logic 404 can be implemented in a similar fashion for the D-PHY mode.

FIG. 15B shows the data path architecture of FIG. 15A being operated in C-PHY mode. As shown in FIG. 15B, a 42-bit parallel data can be used to drive two corresponding C-PHY drivers, which are composed of six half-driver sub-circuits 200-1, 200-2, 200-3, 200-4, 200-5, and 200-6. These half-driver sub-circuits can have the same or similar C-PHY circuit structure as that shown in FIG. 6, FIG. 9, or FIGS. 11-13.

A first group of 21-bit parallel data $C_0<20:0>$ is fed through input routing block 400, which routes the parallel bits directly to three 8-bit serializers 402-1, 402-2, and 402-3. Input routing block 400 may be a signal bypass block that routes bits $C_0<20:2:2>$ to the first 8-bit serializer 402-1, that routes bits $C_0<19:1:2>$ to the second 8-bit serializer 402-2, and that routes bits $C_0<18:0:2>$ to the third 8-bit serializer 402-3. Unlike FIG. 15A, the lane-crossing paths 406 are not in use (deactivated), as indicated by cross 407. The serialized bits output from serializers 402-1, 402-2, and 402-3 can be fed through a first pre-driver combinational logic circuit 404, which converts the raw C-PHY bits to corresponding pre-driver inputs. For the C-PHY mode, the pre-driver logic 404 generates pull-up and pull-down signals AU, AD, BU, BD, CU, and CD for the pull-up and pull-down switches in half-driver sub-circuits 200-1, 200-2, and 200-3.

A second group of 21-bit parallel data $C_1<20:0>$ is fed through input routing block 400, which routes the parallel bits directly to three 8-bit serializers 402-4, 402-5, and 402-6. Input routing block 400 may be a signal bypass block that routes bits $C_1<20:2:2>$ to the fourth 8-bit serializer 402-4, that routes bits $C_1<19:1:2>$ to the fifth 8-bit serializer 402-5, and that routes bits $C_1<18:0:2>$ to the sixth 8-bit serializer 402-6. The lane-crossing paths 406 are not in use, as indicated by cross 407. The serialized bits output from serializers 402-4, 402-5, and 402-6 can be fed through a second pre-driver combinational logic circuit 404, which converts the raw C-PHY bits to corresponding pre-driver inputs. For the C-PHY mode, the pre-driver logic 404 generates pull-up and pull-down signals DU, DD, EU, ED, FU, and FD for the pull-up and pull-down switches in half-driver sub-circuits 200-4, 200-5, and 200-6.

Figure 15D:
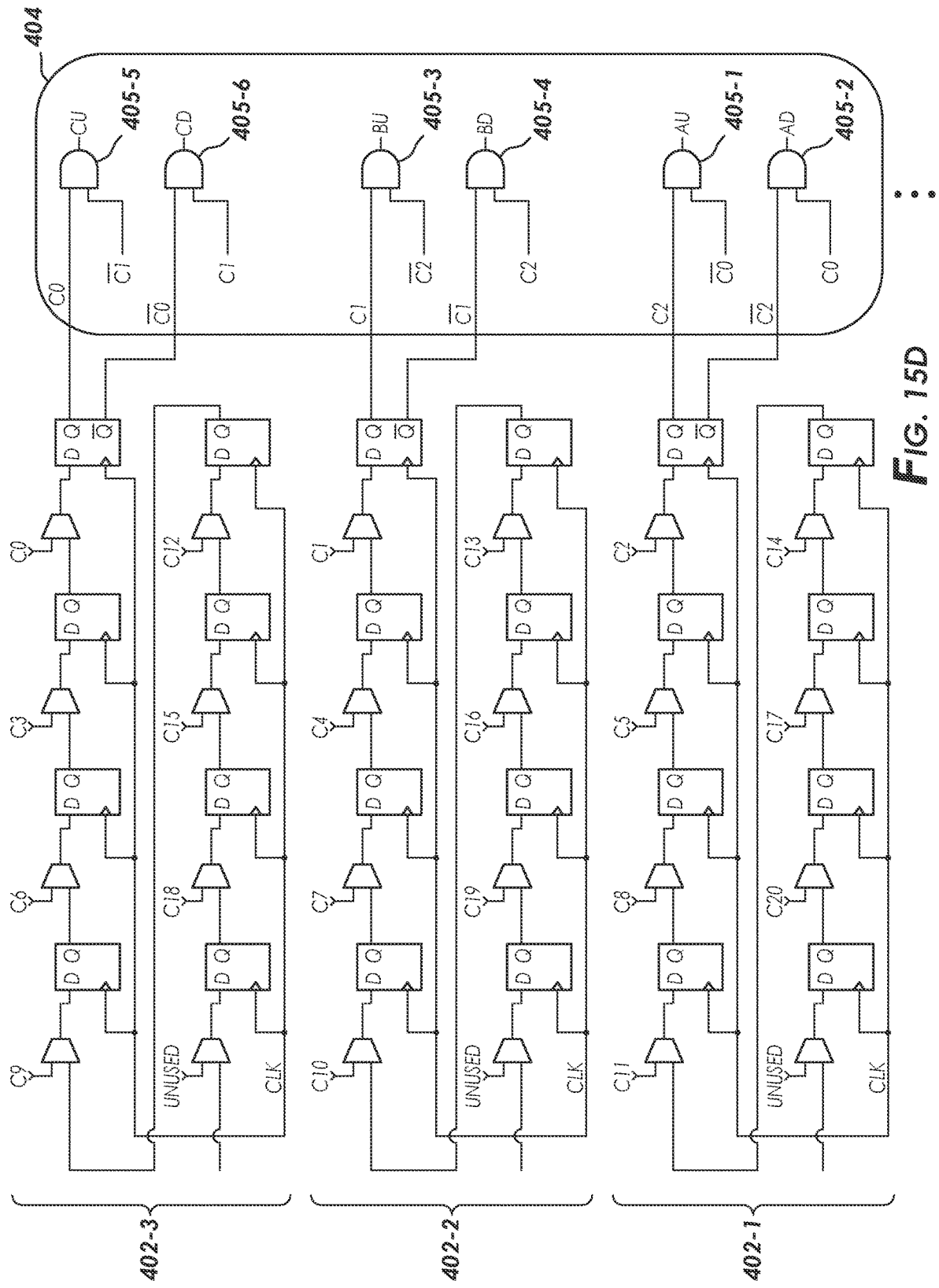
FIG. 15D is a diagram showing how three 8-bit serializers can be combined to produce pre-driver input signals for a C-PHY driver circuit in accordance with some embodiments.

FIG. 15D shows how three 8-bit serializers can be combined to produce pre-driver input signals for a C-PHY driver. Each 8-bit serializer includes eight digital flip-flops with multiplexers selectively passing one of the parallel $C<20:0>$ bits to the inputs of each flip-flop. One of the flip-flops in each 8-bit serializer is unused. The last (trailing) flip-flop in the first 8-bit serializer 402-1 has a first output on which C2 is generated and a second output on which /C2 (i.e., an inverted version of C2) is generated. The last (trailing) flip-flop in the second 8-bit serializer 402-2 has a first output on which C1 is generated and a second output on which /C1 (i.e., an inverted version of C1) is generated. The last (trailing) flip-flop in the third 8-bit serializer 402-3 has a first output on which C0 is generated and a second output on which /C0 (i.e., an inverted version of C0) is generated.

The pre-driver logic 404 may, for example, include logic AND gates 405-1, 405-2, 405-3, 405-4, 405-5, and 405-6. The first logic AND gate 405-1 may have a first input configured to receive C2, a second input configured to receive /C0, and an output on which pull-up control signal AU is generated. The second logic AND gate 405-2 may have a first input configured to receive /C2, a second input configured to receive C0, and an output on which pull-down control signal AD is generated. The third logic AND gate 405-3 may have a first input configured to receive C1, a second input configured to receive /C2, and an output on which pull-up control signal BU is generated. The fourth logic AND gate 405-4 may have a first input configured to receive /C1, a second input configured to receive C2, and an output on which pull-down control signal BD is generated. The fifth logic AND gate 405-5 may have a first input configured to receive C0, a second input configured to receive /C1, and an output on which pull-up control signal CU is generated. The sixth logic AND gate 405-6 may have a first input configured to receive /C0, a second input configured to receive C1, and an output on which pull-down control signal CD is generated. These six control signals can be used to control the pull-up and pull-down switches in a corresponding C-PHY trio (see, e.g., FIG. 15B). The remaining serializers 402-4, 402-5, and 402-6 and the corresponding pre-driver logic 404 can be implemented in a similar fashion for the C-PHY mode.

The embodiment of FIGS. 15A and 15B employs significantly less serializer hardware relative to the example of FIGS. 14A and 14B. The embodiment of FIGS. 15A and 15B, however, includes pre-driver logic 404 in the high-speed serialized domain. In the C-PHY mode, pre-driver logic 404 has to combine data from three separate serializer streams, which can be subject to a certain amount of data skew. In the D-PHY mode, data lane crossing from one serializer to another can also have a certain amount of data skew. If care is not taken, matching the delays across these different paths can be challenging and can impose symmetrical layout criteria.

Figure 16:
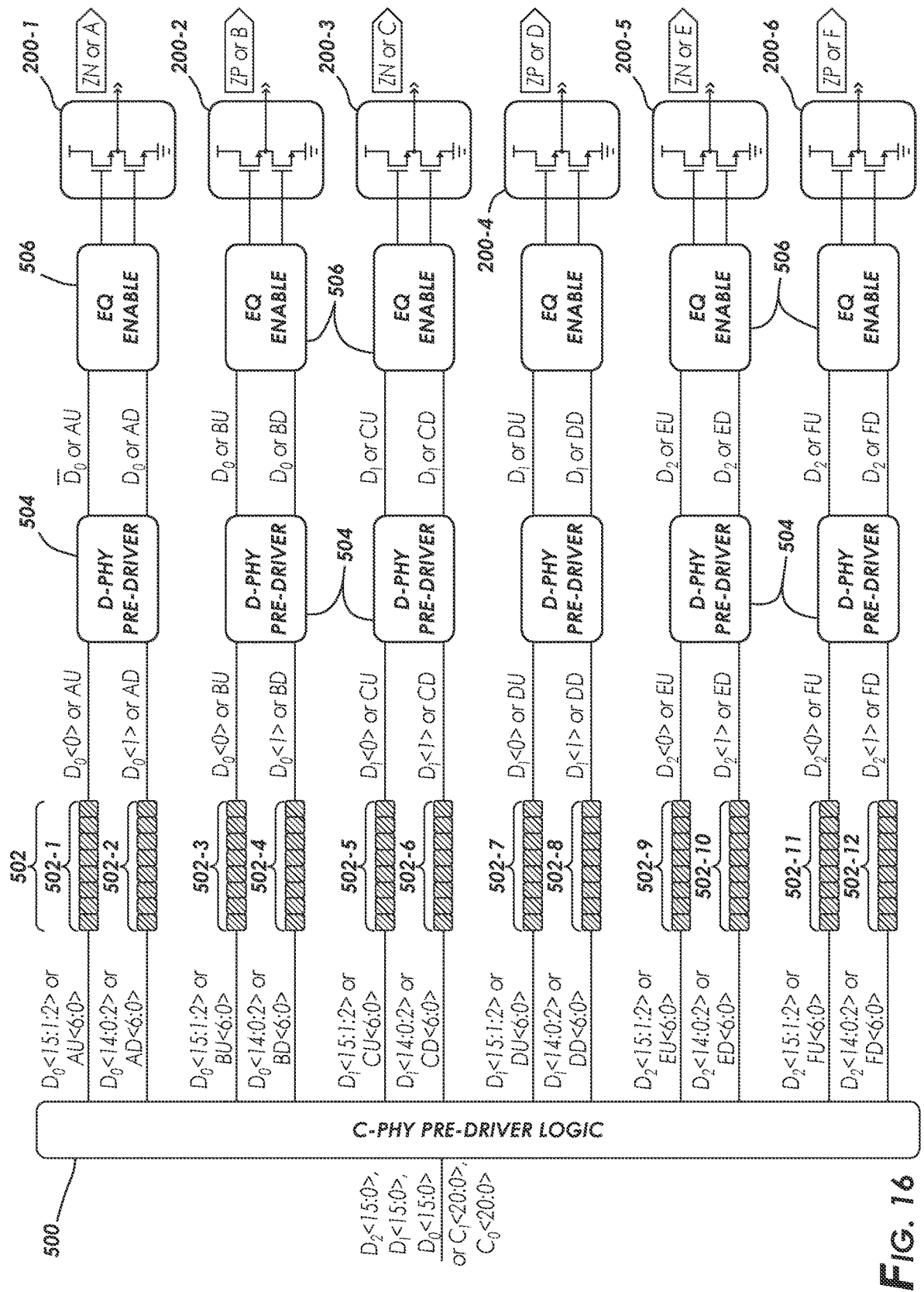
FIG. 16 is a diagram of a shared data path with multiple 8-bit serializers, C-PHY pre-driver logic, and D-PHY pre-driver logic in accordance with some embodiments.

FIG. 16 shows another data path architecture that offers reduced hardware with independent data lanes and thus lower skews. As shown in FIG. 16, the data path can receive a 48-bit parallel data that is intended for three corresponding D-PHY drivers or can receive a 42-bit parallel data that is intended for two corresponding C-PHY drivers. For example, in the D-PHY mode, a first group of 16-bit parallel data $D_0$<15:0> can be used to drive two corresponding half-driver sub-circuit 200-1 and 200-2, a second group of 16-bit parallel data $D_1$<15:0> can be used to drive two corresponding half-driver sub-circuit 200-3 and 200-4, and a third group of 16-bit parallel data $D_2$<15:0> can be used to drive two corresponding half-driver sub-circuit 200-5 and 200-6. Alternatively, in the C-PHY mode, a first group of 21-bit parallel data $C_0$<20:0> can be used to drive three corresponding half-driver sub-circuits 200-1, 200-2, and 200-3, whereas a second group of 21-bit parallel data $C_1$<20:0> can be used to drive three corresponding half-driver sub-circuit 200-4, 200-5, and 200-6. Although the six half-driver sub-circuits 200 of FIG. 16 are shown as including one pull-up transistor and one pull-down transistor, this is merely illustrative and each half-driver sub-circuit 200 can have a circuit structure shown in FIG. 6, can be combined within one or more half-drivers to form D-PHY drivers as shown in FIG. 8, can be combined with one or more half-drivers to form C-PHY drivers as shown in FIG. 9, and/or can be operated to support the various equalization schemes as described in connection with FIGS. 10-13.

The raw parallel data bits can be received at a first pre-driver logic 500. In the D-PHY mode, the first pre-driver logic 500 operates as a bypass block and simply passes the input bits to 12 corresponding 8-bit serializers. In the D-PHY mode, first pre-driver logic 500 may route the odd data bits to the odd serializers. For example, odd data bits $D_0$<15:1:2> can be routed to odd serializer 502-1, odd data bits $D_0$<15:1:2> can be routed to odd serializer 502-3, odd data bits $D_1$<15:1:2> can be routed to odd serializer 502-5, . . . , and odd data bits $D_2$<15:1:2> can be routed to odd serializer 502-11. Similarly, in the D-PHY mode, first pre-driver logic 500 may route the even data bits to the even serializers. For example, even data bits $D_0$<14:0:2> can be routed to even serializer 502-2, even data bits $D_0$<14:0:2> can be routed to even serializer 502-4, . . . , and even data bits $D_2$<14:0:2> can be routed to even serializer 502-12. Note that in the D-PHY mode, some of the data bits are duplicated in adjacent half-drivers to avoid signal lane crossing. In the D-PHY mode, all 8 bits in each 8-bit serializer will be fully in use (i.e., all of the flip-flops will be occupied by some data bit).

In the C-PHY mode, the first pre-driver logic 500 uses combinational logic to convert the raw C-PHY parallel data to C-PHY pre-driver inputs. For example, parallel data bits $C_0$<20:0> can be converted to serial data bits AU<6:0> and AD<6:0> for driving the pull-up and pull-down switches in half-driver 200-1, to serial data bits BU<6:0> and BD<6:0> for driving the pull-up and pull-down switches in half-driver 200-2, and to serial data bits CU<6:0> and CD<6:0> for driving the pull-up and pull-down switches in half-driver 200-3. Similarly, parallel data bits $C_1$<20:0> can be converted to serial data bits DU<6:0> and DD<6:0> for driving the pull-up and pull-down switches in half-driver 200-4, to serial data bits EU<6:0> and ED<6:0> for driving the pull-up and pull-down switches in half-driver 200-5, and to serial data bits FU<6:0> and FD<6:0> for driving the pull-up and pull-down switches in half-driver 200-6. In the C-PHY mode, only 7 bits in each 8-bit serializer will be used (i.e., one bit or flip-flop in each 8-bit serializer will be unused). Since the first pre-driver logic 500 has combinational logic that only changes or converts the bit values in the C-PHY mode, pre-driver logic 500 is sometimes referred to as C-PHY pre-driver logic.

The serialized data bits output from the twelve 8-bit serializers can then be fed through second pre-driver logic 504. In the D-PHY mode, the second pre-driver logic 504 uses combinational logic to convert the serialized D-PHY data to D-PHY pre-driver inputs. FIG. 17A illustrates one suitable implementation of second pre-driver logic 504. As shown in FIG. 17A, second pre-driver logic 504 includes combinational logic component 510 that receives serialized odd bits (e.g., D1) from a first 8-bit serializer 502 and receives serialized even bits (e.g., Do) from a second 8-bit serializer 502. Combinational logic component 510 can include a 2:1 serializer. Multiplexers 512 can be use do route complementary data bits from combinational logic component 510 to the gates of the pull-down and pull-up switches in half-driver sub-circuit 200. For instance, in a first cycle, even data bits $D_0$ and $/D_0$ can be routed to sub-circuit 200. In a second cycle, odd data bits $D_1$ and $/D_1$ can be routed to sub-circuit 200. In a third cycle, even data bits $D_2$ and $/D_2$ can be routed to sub-circuit 200. In a fourth cycle, odd data bits D3 and /D3 can be routed to sub-circuit 200, and so on for remaining even and odd data bits in an alternating sequence.

In the C-PHY mode, the second pre-driver logic 504 simply serves as a bypass block (see, e.g., FIG. 17B). As shown in FIG. 17B, combinational logic component 510 is switched out of use, and serialized data bits AU from a first 8-bit serializer is fed directly to the pull-up switch in a corresponding half-driver 200 via the first multiplexer 512 while serialized data bits AD from a second 8-bit serializer is fed directly to the pull-down switch in corresponding half-driver 200 via the second multiplexer 512. In the C-PHY mode, only 7 bits in each 8-bit serializer will be used (i.e., one bit or flip-flop in each 8-bit serializer will be unused). Since combinational logic component 510 in the second pre-driver logic 504 is only active or switched into use during the D-PHY mode, second pre-driver logic 504 is sometimes referred to as D-PHY pre-driver logic.

Referring back to FIG. 16, equalization enable circuits 506 can be coupled between the second pre-driver logic 506 and the half-driver sub-circuits 200. For example, a first equalization (EQ) enable circuit 506 is coupled at the inputs of half-driver sub-circuit 200-1, whereas a second equalization enable circuit 506 is coupled at the inputs of half-driver sub-circuit 200-2. To enable equalization, each equalization enable block 506 receives a one-cycle delayed data from the associated serializer 502 and passes an appropriate input to configure one or more slices in the half-driver 200 to operate in a way that meets the desired D-PHY or C-PHY specifications (e.g., by computing the number of slices working in the opposite direction using equations 1-8).

The data path architecture of FIG. 16 can provide reduced hardware for the D-PJHY mode while ensuring minimal data skew for the C-PHY mode. Since the D-PHY mode is synchronous, the D-PHY mode can tolerate higher skews relative to the C-PHY mode. The first pre-driver logic 502 is also simpler in the D-PHY mode (e.g., logic 502 is configured as an input bypass block in the D-PHY mode), which provides even lower skews compared to the C-PHY mode. Compared to the embodiment of FIGS. 15A and 15B, the data path architecture of FIG. 16 may be technically advantageous since there is no high-speed lane crossing in the D-PHY mode. Thus, each data lane can be designed, replicated, and placed symmetrically with respect to one another, which provides better delay matching. In other words, each data line is independent, which enables lower skews and thus higher speed of operation. Moreover, the more complex C-PHY pre-driver logic 500 is pushed to the low-speed domain before the serializers, which can facilitate with clock recovery at the receiver end. Compared to the embodiment of FIGS. 14A and 14B, the data path architecture of FIG. 16 uses half the amount of serializers with similar skew behavior during the C-PHY mode. Furthermore, the D-PHY pre-driver logic 504 is relatively simple (see, e.g., FIGS. 17A and 17B) and does not introduce a high amount of skew in the high-speed serialized domain. The data path architecture of FIG. 16 can also support dual-edge input data in the D-PHY mode to reduce switching power.

The foregoing is merely illustrative and various modifications can be made to the described embodiments. The foregoing embodiments may be implemented individually or in any combination.

What is claimed is:

1. Circuitry comprising:
a plurality of half-driver sub-circuits operable in
(1) a first mode in which the half-driver sub-circuits are coupled together in groups of two and
(2) a second mode in which the half-driver sub-circuits are coupled together in groups of three, wherein each half-driver sub-circuit in the plurality of half-driver sub-circuit comprises:
a pull-up path having one or more pull-up transistors, and
a pull-down path having one or more pull-down transistors.

2. The circuitry of claim 1, wherein the first mode comprises a Mobile Industry Processor Interface (MIPI) D-PHY mode, and wherein the second mode comprises a Mobile Industry Processor Interface (MIPI) C-PHY mode.

3. The circuitry of claim 2, wherein the pull-up path includes at least first and second pull-up transistors and wherein the pull-down path includes at least first and second pull-down transistors.

4. The circuitry of claim 3, wherein the first and second pull-up transistors comprise first and second n-type transistors and wherein the first and second pull-down transistors comprise third and fourth n-type transistors.

5. The circuitry of claim 3, wherein the pull-up path further comprises:
a first resistor coupled at a drain terminal of the first pull-up transistor;
a second resistor coupled at a source terminal of the first pull-up transistor;
a third resistor coupled at a drain terminal of the second pull-up transistor; and
a fourth resistor coupled at a source terminal of the second pull-up transistor.

6. The circuitry of claim 3, wherein the pull-up path further comprises:
a first resistor coupled at a drain terminal of the first pull-down transistor;
a second resistor coupled at a source terminal of the first pull-down transistor;
a third resistor coupled at a drain terminal of the second pull-down transistor; and
a fourth resistor coupled at a source terminal of the second pull-down transistor.

7. The circuitry of claim 6, wherein the first, second, third, and fourth resistors have the same resistance value.

8. The circuitry of claim 3, wherein:
during a D-PHY low state and a C-PHY low state, the first and second pull-down transistors are turned on while the first and second pull-up transistors are turned off;
during a D-PHY high state and a C-PHY high state, the first and second pull-down transistors are turned off while the first and second pull-up transistors are turned on;
during a C-PHY mid state, the first pull-down transistor and the first pull-up transistor are turned off while the second pull-down transistor and the second pull-up transistors are turned on; and
during a C-PHY float state, the first and second pull-down transistors and the first and second pull-up transistors are turned off.

9. The circuitry of claim 2, wherein each half-driver sub-circuit in the plurality of half-driver sub-circuits includes m number of slices and wherein to perform equalization during the D-PHY mode, (m−j) slices in each half-driver sub-circuit in the plurality of half-driver sub-circuits are pulling in a first direction while j slices in each half-driver in each half-driver sub-circuit in the plurality of half-driver sub-circuits are pulling in a second direction opposite to the first direction.

10. The circuitry of claim 2, wherein each half-driver sub-circuit in the plurality of half-driver sub-circuits includes m number of slices and wherein to perform a high state equalization during the C-PHY mode, (m−n) slices in each half-driver sub-circuit in the plurality of half-driver sub-circuits are pulling up while n slices in each half-driver sub-circuit in the plurality of half-driver sub-circuits are pulling down.

11. The circuitry of claim 2, wherein each half-driver sub-circuit in the plurality of half-driver sub-circuits includes m number of slices and wherein to perform a low state equalization during the C-PHY mode, (m−n) slices in each half-driver sub-circuit in the plurality of half-driver sub-circuits are pulling down while n slices in each half-driver sub-circuit in the plurality of half-driver sub-circuits are pulling up.

12. The circuitry of claim 2, wherein each half-driver sub-circuit in the plurality of half-driver sub-circuits includes m number of slices and wherein to perform a first mid state equalization during the C-PHY mode, (m/2) slices in each half-driver sub-circuit in the plurality of half-driver sub-circuits are pulling down while (m/2) slices in each half-driver sub-circuit in the plurality of half-driver sub-circuits are pulling up.

13. The circuitry of claim 2, wherein each half-driver sub-circuit in the plurality of half-driver sub-circuits includes m number of slices and wherein to perform a second mid state equalization during the C-PHY mode, (m/2+n) slices in each half-driver sub-circuit in the plurality of half-driver sub-circuits are pulling up while (m/2−n) slices in each half-driver sub-circuit in the plurality of half-driver sub-circuits are pulling down.

14. The circuitry of claim 2, wherein each half-driver sub-circuit in the plurality of half-driver sub-circuits includes m number of slices and wherein to perform a third mid state equalization during the C-PHY mode, (m/2+n) slices in each half-driver sub-circuit in the plurality of half-driver sub-circuits are pulling down while (m/2−n) slices in each half-driver sub-circuit in the plurality of half-driver sub-circuits are pulling up.

15. Circuitry comprising:
inputs configured to receive parallel data bits;
a plurality of serializers;
a plurality of half-driver sub-circuits operable in (1) a first mode in which the half-driver sub-circuits are coupled together in groups of two and (2) a second mode in which the half-driver sub-circuits are coupled together in groups of three;
first pre-driver logic coupled between the inputs and the plurality of serializers; and
second pre-driver logic coupled between the plurality of serializers and the plurality of half-driver sub-circuits.

16. The circuitry of claim 15, wherein the first mode comprises a Mobile Industry Processor Interface (MIPI) D-PHY mode, wherein the second mode comprises a Mobile Industry Processor Interface (MIPI) C-PHY mode, wherein the inputs are configured to receive groups of 16-bit parallel data in the D-PHY mode and are configured to receive groups of 21-bit parallel data in the C-PHY mode, wherein the plurality of serializers comprises a plurality of 8-bit serializers, wherein each of the 8-bit serializers are fully in use in the D-PHY mode, and wherein each of the 8-bit serializers has an unused portion in the C-PHY mode.

17. The circuitry of claim 16, wherein the first pre-driver logic is configured to operate as a bypass block in the D-PHY mode and uses combinational logic within the first pre-driver logic to convert the parallel data bits to C-PHY pre-driver inputs in the C-PHY mode.

18. The circuitry of claim 16, wherein the second pre-driver logic is configured to operate as a bypass block in the C-PHY mode and uses combinational logic within the second pre-driver logic to convert serialized data bits output from the plurality of serializers to complementary D-PHY pre-driver inputs in the D-PHY mode, and wherein the second pre-driver logic comprises a plurality of multiplexers configured to selectively bypass the combinational logic in the C-PHY mode.

19. The circuitry of claim 16, further comprising:
equalization enable circuitry coupled between the second pre-driver logic and the plurality of half-driver sub-circuits, wherein the equalization enable circuitry is configured to operate a first portion of each half-driver sub-circuit to pull in a first direction and to operate a second portion of each half-driver sub-circuit to pull in a second direction opposing the first direction.

20. The circuitry of claim 15, wherein each half-driver sub-circuit in the plurality of half-driver sub-circuits comprises:
a first pull-up transistor;
a second pull-up transistor;
a first pull-down transistor;
a second pull-down transistor;
first and second resistors coupled at drain and source terminals of the first pull-up transistor;
second and fourth resistors coupled at drain and source terminals of the second pull-up transistor;
fifth and sixth resistors coupled at drain and source terminals of the first pull-down transistor; and
seventh and eighth resistors coupled at drain and source terminals of the second pull-down transistor.

* * * * *